(12) United States Patent
Fuller et al.

(10) Patent No.: US 8,285,611 B2
(45) Date of Patent: Oct. 9, 2012

(54) METHOD FOR IN-CAB DRIVER OPERATION

(76) Inventors: Max L. Fuller, Ooltewah, TN (US);
Kenneth W. Crane, Ringgold, GA (US);
Robert Lathrop, Soddy Daisy, TN (US);
Scott Davison, Chattanooga, TN (US)

( * ) Notice: Subject to any disclaimer, the term of this patent is extended or adjusted under 35 U.S.C. 154(b) by 228 days.

(21) Appl. No.: 12/648,571

(22) Filed: Dec. 29, 2009

(65) Prior Publication Data
US 2010/0169199 A1     Jul. 1, 2010

Related U.S. Application Data

(60) Provisional application No. 61/142,028, filed on Dec. 31, 2008.

(51) Int. Cl.
*G07F 19/00* (2006.01)
*G01C 21/00* (2006.01)
(52) U.S. Cl. .................................. 705/34; 701/208
(58) Field of Classification Search .................. 705/34
See application file for complete search history.

(56) References Cited

U.S. PATENT DOCUMENTS

| | | | |
|---|---|---|---|
| 4,926,495 A | 5/1990 | Comroe et al. | |
| 5,223,844 A | 6/1993 | Mansell et al. | |
| 5,297,908 A | 3/1994 | Knott | |
| 6,041,318 A | 3/2000 | Danford-Klein et al. | |
| 6,047,271 A | 4/2000 | Danford-Klein et al. | |
| 6,061,667 A | 5/2000 | Danford-Klein et al. | |
| 6,122,671 A | 9/2000 | Farrar et al. | |
| 6,536,607 B1 | 3/2003 | Knoll et al. | |
| 6,910,591 B2 | 6/2005 | Knoll et al. | |
| 7,271,737 B1 * | 9/2007 | Hoffberg | 340/905 |
| 7,271,742 B2 | 9/2007 | Sheha et al. | |
| 7,307,514 B2 | 12/2007 | McAden | |
| 7,336,159 B2 | 2/2008 | Fackrell et al. | |
| 7,646,296 B2 | 1/2010 | Ohki | |
| 7,650,425 B2 | 1/2010 | Davis et al. | |
| 7,729,684 B1 | 6/2010 | Straub | |
| 7,881,838 B2 | 2/2011 | Larschan et al. | |

(Continued)

OTHER PUBLICATIONS

"FleetMatics" GPD Vehicle Tracking System, Sep. 9, 2008.*

(Continued)

*Primary Examiner* — Garcia Ade
(74) *Attorney, Agent, or Firm* — Peter L. Brewer; Baker Donelson Bearman Caldwall & Berkowitz PC

(57) ABSTRACT

A method for transporting cargo using a truck is provided. Preferably, the method is used in connection with full truckload operations. The method generally includes powering up a communications module residing within a cab of the truck. The communications module comprises a vehicle navigation system, a modem for receiving telecommunications signals, a processing unit for associating instructions for cargo delivery locations with geo-positioning coordinates, and a user interface. The method further includes receiving a cargo delivery data set at the communications module. The data set is sent from a host trucking management system. The data set provides at least a first cargo delivery location for the driver. The method then includes the driver acknowledging receipt of the first cargo delivery location through the user interface. Acknowledgment of receipt of the first cargo delivery location causes a signal to be sent from the communications module to the host trucking management system. The method also includes driving the truck and cargo to the first cargo delivery location. Upon arrival, the host trucking management system is informed. This is done by sending a first arrival signal from the communications module.

25 Claims, 15 Drawing Sheets

U.S. PATENT DOCUMENTS

| | | | |
|---|---|---|---|
| 7,894,825 | B2 | 2/2011 | Wallace et al. |
| 7,903,029 | B2 | 3/2011 | Dupray |
| 7,908,080 | B2 | 3/2011 | Rowley et al. |
| 2001/0013835 | A1 | 8/2001 | Hsu et al. |
| 2008/0091575 | A1 | 4/2008 | Naghshineh et al. |
| 2008/0163231 | A1 | 7/2008 | Breen et al. |
| 2008/0186166 | A1* | 8/2008 | Zhou et al. ............... 340/539.13 |
| 2008/0215336 | A1 | 9/2008 | Osterling et al. |
| 2008/0319653 | A1* | 12/2008 | Moshfeghi .................... 701/208 |

OTHER PUBLICATIONS

Screenshot from http://www.fleetmatics.com/categories/78/Default.aspx—web page for a GPS Vehicle Tracking System (printed Sep. 9, 2008) (2 pages).

Screenshot from http://www.fleetmatics.com/Default.aspx—web page for a GPS Vehicle Tracking System (printed Oct. 8, 2010) (3 pages).

http://www.drivertech.com/. This website sets forth a communications device for the transportation industry. (1 page).

http://www.drivertech.com/resources/resources.html. This website provides access to a variety of documents that further explain the DriverTech technologies. (2 pages).

DriverTech DT4000 Brochure. This brochure is available online at http://www.drivertech.com. The brochure discusses the DT4000 model. (2 pages).

The Future of In-Cab Choices Bochure. This bochure is available on-line at http://www.drivertech.com. (2 pages).

http://www.gps-planet.com/truckgps.html. This website shows a variety of navigational systems for purchase. The site addresses navigational needs of the professional driver, listing various systems. (4 pages).

http://www.gps-planet.com/ramcrotofort1.html. This website lists software for the navigational needs of the professional driver. The software is called "Rand McNally Route Tools for Truckers—CD." (2 pages).

http://www.dieselboss.com/Travrout/cptruck.htm. This website advertises a "CoPilot Truck GPS Laptop 11." It is a navigational system for professional drivers, which includes a variety of features. (2 pages).

DriverTech Truck PC User Guide.pdf. This user guide was written by DriverTech, and it sets forth how to use each function of the Truck PC navigational system. (31 pages).

Microsoft Word—XPE Truck Online Application Manual rev.pdf. This manual instructs the user how to use the XPE Truck version 1.5 navigational system. (29 pages).

XPE Truck User Manual v1.1.1.pdf. The manual is used to direct the user how to best utilize the navigational system and other functions of a DriverTech device. (2006) (25 pages).

http://www.drivertech.com/docs/MGHD-casestudy.pdf. EMS Data Management Case Study (May 2004). (10 pages).

http://www.drivertech.com/docs/mobile-technology.pdf. Paper on mobile technology from Zoll Data Systems (Apr. 2005). (2 pages).

http://www.drivertech.com/partners/partners.html. This website shows a variety of DriverTech business partners. (5 pages).

http://www.drivertech.com/news/pr080404a.pdf. Press release dated Apr. 4, 2008 re: U.S. Xpress driver training. (3 pages).

Screenshot from http://www.qualcomm.eu/Services/TransportLogistics/Solutions.aspx discussing Fleetvisor services (printed Jul. 29, 2010) (1 page).

Screenshot from http://www.qualcomm.eu/Services/TransportLogistics/Solutions/MCP200.aspx discussing Mobile Computing Platform 200 (printed Jul. 29, 2010) (2 pages).

Screenshot from http://www.qualcomm.eu/Services/TransportLogistics/Mobile%20Platform/Add-ons.aspx discussing Fleetvisor services (printed Jul. 29, 2010) (3 pages).

Screenshot from http://www.qualcomm.eu/Services/TransportLogistics/Solutions/OmniExpress.aspx discussing mobile communications services (printed Jul. 29, 2010) (2 pages).

Qualcomm brochure for In-Cab Document Management—manages paper work through the scanning and transmission of documents (copyright 2010) (2 pages).

Qualcomm slides for In-Cab Scanning—sales presentation for a product that manages paper work through the scanning and transmission of documents (date unknown) (7 pages).

Qualcomm brochure for Content Delivery Service—form for system administrator (copyright 2008) (2 pages).

Qualcomm slides for Critical Event Reporting—sales presentation for program that identifies and responds to unsafe driving behavior (date unknown) (14 pages).

Qualcomm brochure for Critical Event Reporting—Product Fact Sheet for program that identifies and responds to unsafe driving behavior to improve driver safety (copyright 2008) (6 pages).

Qualcomm slides for Content Delivery Service—sales presentation for system that delivers audio recordings to drivers in-cab (date unknown) (9 pages).

Qualcomm brochure for Critical Event Reporting—program that identifies and responds to unsafe driving behavior (copyright 2009) (2 pages).

Qualcomm slides for Hours of Service—electronic on-board recording system that creates driver logs (date unknown) (14 pages).

Qualcomm brochure for Driver Notification Service—program that sends dispatch or other messages to a driver's mobile phone (date unknown) (2 pages).

Qualcomm slides for Hours of Service—sales presentation for driver training services for use of software for computer-based management of driver hours (date unknown) (37 pages).

Qualcomm brochure for Hours of Service—software for computer-based management of driver hours (copyright 2008) (2 pages).

Qualcomm slides for In-Cab Video Training—providing training sessions for drivers in the field (date unknown) (7 pages).

Qualcomm brochure for Mobile Computing Platform 200 Series—Technical Spec Sheet for mobile communication services (copyright 2009) (16 pages).

Qualcomm slides for Maptuit NaviGo services—real time, hybrid, in-cab navigation service (date unknown) (6 pages).

Qualcomm brochure discussing log-in for the Navigo navigation program (copyright 2008) (2 pages).

Qualcomm slides for Driver Workflow—offers a mobile computing platform to communicate dispatches (date unknown) (30 pages).

Qualcomm Hours of Service—System Administrator's Guide for computer-based management of driver hours (copyright 2006-2008—v. 2.1 dated Jul. 2008) (54 pages).

Qualcomm OmniVision Mobile Computing Platform and Accessory Installation Guide (copyright 2009) (232 pages) (filed under seal).

* cited by examiner

600A

600C

600D 602D  604D

600E 602E  604E

1400A

1400B

METHOD FOR IN-CAB DRIVER OPERATION

CROSS REFERENCE TO RELATED APPLICATIONS

This application claims the benefit of U.S. provisional patent application No. 61/142,028 which was filed on Dec. 31, 2008. That application is titled "System for In-Cab Driver Operations," and is incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

1. Field of the Invention

The present invention relates to navigation systems for motor vehicles. More specifically, the present invention pertains to methods for communicating with drivers of full truckload trucks and transporting cargo.

2. Technology in the Field of the Invention

The trucking industry is an integral part of the economy in the United States. Tractor-trailers traverse the highways of our nation carrying both goods to be used in manufacturing, and goods that will be offered for retail sale. According to a March 2003 report of the U.S. Department of Transportation's Federal Highway Administration, there were at that time an estimated 770,000 tractors in use for full truckload delivery. See http://ops.fhwa.dot.gov/freight/publications/eval_mc_industry/index.htm.

Full truckload shipping generally involves the movement of large amounts of cargo for a single customer. Full truckload, or FTL shipping means, that an entire semi-trailer or intermodal container is filled for delivery. It is possible with an FTL order that the driver will make one or more intermediate stops, either to take on additional freight or to make partial deliveries. However, the loads on the truck are billed to a single customer, typically under a single price. This is as opposed to a less-than-truckload (LTL) company that generally mixes freight from several customers in each trailer.

The full truckload shipping industry is carried out by trucking companies that generally contract to carry an entire trailer-load for a single customer. The customer is referred to a consignor. Full truckload carriers normally deliver a semi-trailer to the shipper, who will then fill the trailer with freight for one destination. After the trailer is loaded, the driver may obtain a bill of lading or invoice, and depart with the trailer containing the freight. In most cases, the driver then proceeds directly to a delivery point where a consignee receives and unloads the freight. Occasionally, a driver will transfer the trailer to another driver who will drive the freight the rest of the way.

Full truckload transit times are oftentimes constrained by the driver's availability according to Hours of Service regulations and distance. In addition, trucking companies oftentimes direct FTL drivers to use certain routes and certain refueling locations. Trucking companies may also provide desired cargo pick-up and delivery times for the drivers.

Because full truckload carriers are asked to ship a wide variety of items, a carrier will often specialize in moving a specific kind of freight. Some carriers will primarily transport food and perishable items, whereas others may specialize in moving poisonous or hazardous materials. Federal regulations exist which provide what types of freight can be shipped together in the same trailer. Certain drivers may only transport specific types of freight because different equipment and insurance is needed for the different kinds of freight.

Some domestic trucking companies have large fleets of trucks. These companies may own or lease numerous trailers as part of their fleet. In some instances, a fleet may exceed one thousand trucks, and even more trailers. In addition, many trucking companies utilize the services of independent owner-operators distributed across the country. These owner-operators own their own trucks but provide driving services for hire to a trucking company.

It is desirable for trucking companies to be able to communicate with their full truckload drivers concerning the execution of delivery orders. To this end, it is desirable for trucking companies to send electronic messages to drivers concerning load pick-up and delivery locations. Telecommunications equipment is available in the industry that permits trucking companies to send delivery order information to their drivers via electronic data exchange. Such equipment, including hardware configurations, is available from certain companies such as Driver Tech of Salt Lake City, Utah.

When a full truckload driver receives instructions concerning a delivery order, the driver has the option of manually inputting the destination information into a global positioning system, or GPS. Examples of such GPS systems include Garmin® and ALK's Co-Pilot®. This is a separate operation that requires the driver to manually input address data himself. In addition, if the driver wishes to obtain navigation assistance concerning fuel stops, interim pick-up locations, or mechanical repairs, the driver again must separately and sequentially input the destination information into the GPS system.

In addition, once a FTL driver has reached a delivery location and unloaded the truck, the driver must advise the trucking company that the delivery order has been filled. This usually requires a telephone call or the manual input of data into a mobile device.

It is desirable, therefore, to provide a system wherein a delivery order can be provided to a truck driver electronically, and wherein navigational information concerning the delivery order is automatically provided for the driver through a vehicle navigation system. Moreover, it is desirable to have a system and method for in-cab driver operation wherein the trucking company can issue a dispatch to a driver in a remote location, and wherein the dispatch includes initial pick-up location, interim pick-up or drop off locations, fuel route information, and/or final delivery location. A need exists for such a system as well as a method for tracking the location of the truck driver during execution of a delivery order and automatically alerting the trucking company when a truck driver reaches a pick-up or delivery location.

BRIEF SUMMARY OF THE INVENTION

The present invention first provides a method for transporting cargo using a truck. The truck includes a cab in which a driver operates the truck. The method generally includes powering up a communications module residing in the cab of the truck. The communications module comprises a vehicle navigation system, a modem for receiving wireless telecommunications signals, a processing unit for associating instructions for cargo delivery locations with geo-positioning coordinates, and a user interface.

The method further includes receiving a cargo delivery data set at the communications module. The data set is sent from a host trucking management system. The data set provides at least a first cargo delivery location for the driver. The method then includes the driver acknowledging receipt of the first cargo delivery location through the user interface. Acknowledgment of receipt of the first cargo delivery location causes a signal to be sent from the communications module to the host trucking management system.

The method next includes driving the truck and cargo to the first cargo delivery location. En route to the first cargo delivery location, the driver will reference a map provided through the vehicle navigation system. The map directs the driver to the first cargo delivery location. The method then includes arriving at the first cargo delivery location with the cargo.

The method next includes informing the host trucking management system of approximate arrival of the truck at the first cargo delivery location. This is done by sending a first arrival signal from the communications module. The first arrival signal may be initiated by the driver through the user interface. Alternatively, the first arrival signal may be sent automatically by the processing unit upon receiving confirmation from the vehicle navigation system that the driver is within a specified distance from the first delivery location.

Preferably, the method is used in connection with full truckload operations.

BRIEF DESCRIPTION OF THE DRAWINGS

So that the manner in which the present invention can be better understood, certain illustrations, screen prints and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Figure 1:
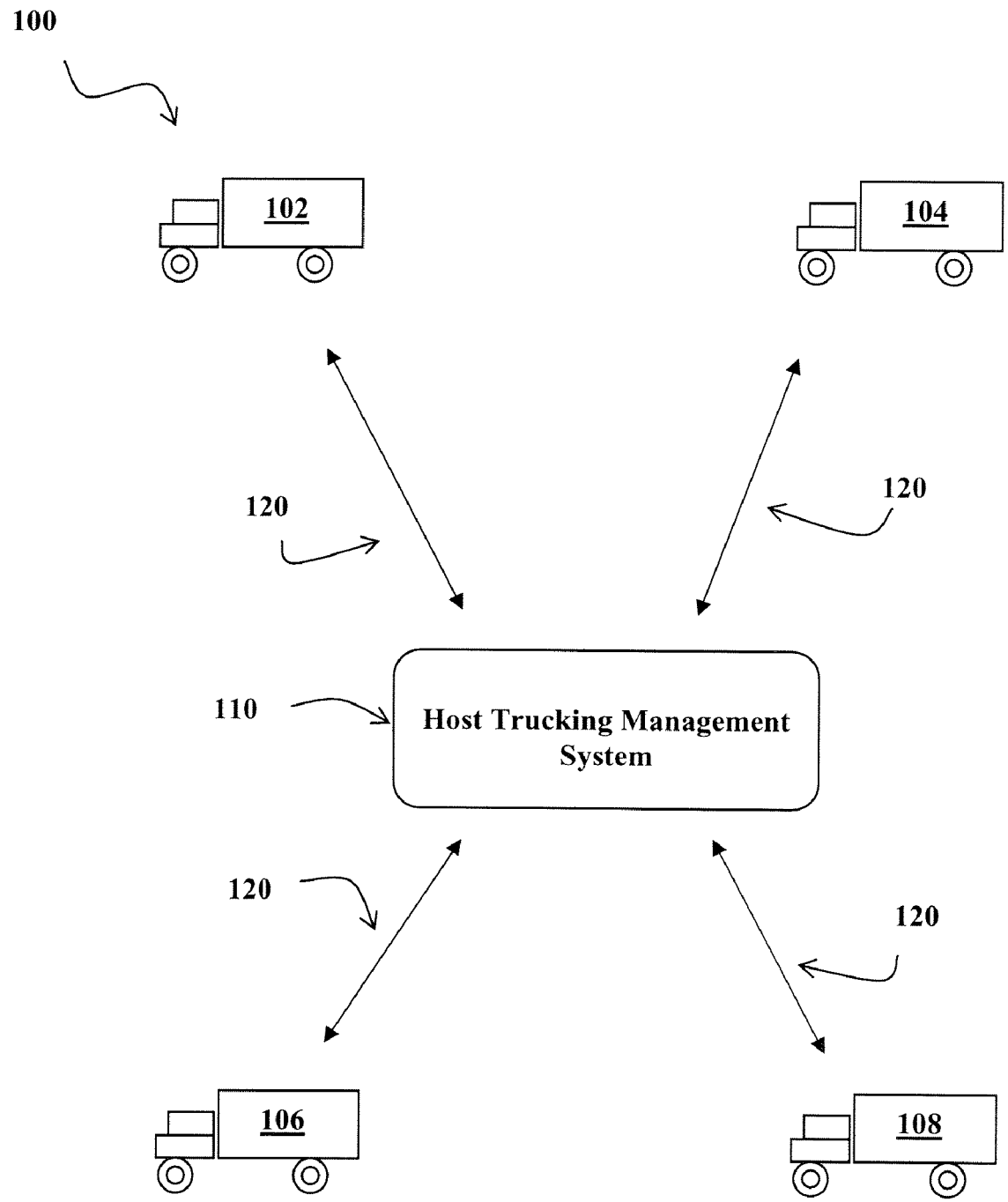
FIG. 1 is a diagram showing interaction between a host trucking management system and a plurality of full truckload trucks. The host trucking management system communicates with communications modules within the trucks via a wireless communications network.

FIG. 1 is a diagram 100 showing interaction between a host trucking management system 110 and a plurality of full truckload trucks. The trucks are numbered as 102, 104, 106, and 108. The trucks 102, 104, 106, and 108 are preferably part of a larger fleet of trucks utilized by a trucking company for filling cargo delivery or "dispatch" orders. While four trucks are shown in FIG. 1, it is understood that the present methods are not limited to the number of trucks that are controlled by the host trucking management system 110.

The host trucking management system 110 communicates with communications modules within the trucks 102, 104, 106, and 108. The communications modules reside within the cabs of the respective trucks 102, 104, 106, and 108 so that they may be readily accessed by drivers of the trucks 102, 104, 106, and 108. The communications modules define small information processing units operated through software. The communications modules are capable of receiving data streams from the host trucking management system 110. The data streams comprise information related to a cargo delivery order. Thus, the communications modules offer an in-cab solution that provides truck drivers with easy access to communications with a central trucking headquarters. As will be seen, the communications modules also facilitate improved workflow management.

The communications modules each include a vehicle navigation system. The vehicle navigation system includes software that provides the driver with a map to a desired destination and, preferably, verbal directions. The vehicle navigation system allows the communications modules to provide specific turn-by-turn directions to drivers to a sequence of destinations. The navigational software is preferably specific to the trucking industry. In this respect, trucks are prohibited by law from traveling on certain roads. In addition, full-truckload trucks are oftentimes unable to drive under certain bridges or other low overhangs. ALK Technologies' Co-Pilot™ truck software is an example of a navigational program that is compatible with the domestic trucking industry.

The communications modules also include a processing unit for associating instructions for cargo delivery locations with geo-positioning coordinates. Thus, when instructions are sent from a trucking company headquarters through the host trucking management system 110 and to the communications modules, the driver is automatically provided with driving directions without having to manually input location data. The processing unit is able to store data related to a series of pick-up, delivery, and refueling locations, as well as schedules. A suitable example of a processor with memory for the communications module is Microsoft SQL Compact Edition. This unit can not only store data, but is robust enough to handle the harsh and unpredictable environments that can exist when deployed on a tractor. Further, the unit is lightweight enough to work on the embedded platform, while providing flexibility and room for additional applications.

The communications modules also each include a modem. The modem receives wireless telecommunications signals as generated by the host trucking management system 110.

In addition, the communications modules each include a user interface. The user interface enables the truck driver to receive instructions from the host trucking management system, and to communicate with the trucking company dispatcher or headquarters. Preferably, the user interface provides a touch screen for a driver based upon Windows Presentation Foundation, or WPF. In one aspect, a modular approach is provided to simplify and centralize software responsibilities within the user interface. The modular approach allows the manager of the host trucking management system 110 to remotely configure each communications module, providing the flexibility to enable or disable modules via a data message, and tailoring the communications modules to the demands of different facets of the trucking industry.

Communications between the host trucking management system 110 and the communications modules is via a wireless communications network. The wireless communications network is indicated schematically through arrows 120. It is understood that the wireless communications network 120 will operate through either a system of cells with cell towers having antennae, or through satellite linking. It is preferred that the host trucking management system 110 take advantage of an existing communications backbone such as that offered by Driver Tech. However, the present methods are not limited to the source or nature of the wireless communications network. In one aspect, a communications network is provided through Driver Tech or other company that offers a communications backbone.

The host trucking management system 110 operates by means of a central processing unit or CPU. The CPU may be located onsite at a trucking company's offices. Alternatively, the CPU may be located off-site either at a facility owned by the trucking company or at a facility owned by a company contracted to provide information technology support services.

The host trucking management system 110 may operate within an existing shell. The shell may be, for example, a combination of hardware and software that enables wireless communications through an existing network. The shell enables new software for delivering cargo delivery data sets to the communications modules. The cargo delivery data sets represent streams of data that include both instructions to a driver concerning cargo delivery or pick-up, and instructions to the communications modules to operate the navigational software.

In one aspect, the data streams contain information for a truck driver concerning pick-up locations. "Pick-up location" means the location at which a load would be picked up to be carried by the truck driver in the attached trailer. The pick-up information may also include a scheduled delivery time or window of time for delivery. The pick-up location may also contain information concerning the identity of the customer and contact information.

The data stream may further include information concerning interim locations. The interim locations may be locations for subsequent pick-ups. Alternatively or in addition, the interim locations may be locations for interim deliveries. The interim location information would preferably include additional contact information related to the interim locations. Such information might include the names of contact person, telephone numbers or other identifying profile information.

The data streams may further include information concerning refueling. In this respect, trucking companies oftentimes have existing contracts with fuel suppliers. These contracts will include negotiated fuel prices and services. The refueling information will include the location where fuel should be obtained by the truck driver and, preferably, the general time in which refueling should take place. The refueling information may also contain contact information and hours of operation for a fuel supplier.

The data stream will finally include a final delivery location. The final delivery location represents the location at which the delivery order is to be finally filled. The delivery location will include not only information concerning the location for final delivery, but also preferably contact information at the final delivery location such as one or more representatives and their respective telephone numbers. The final cargo delivery location may further provide a desired delivery time or window of time for final delivery.

The data streams not only provide textual instructions, but operate with software on the in-cab communications module to automate navigational and directional software via embedded GPS coordinates. In addition, certain decision-making capabilities are provided.

Figure 2:
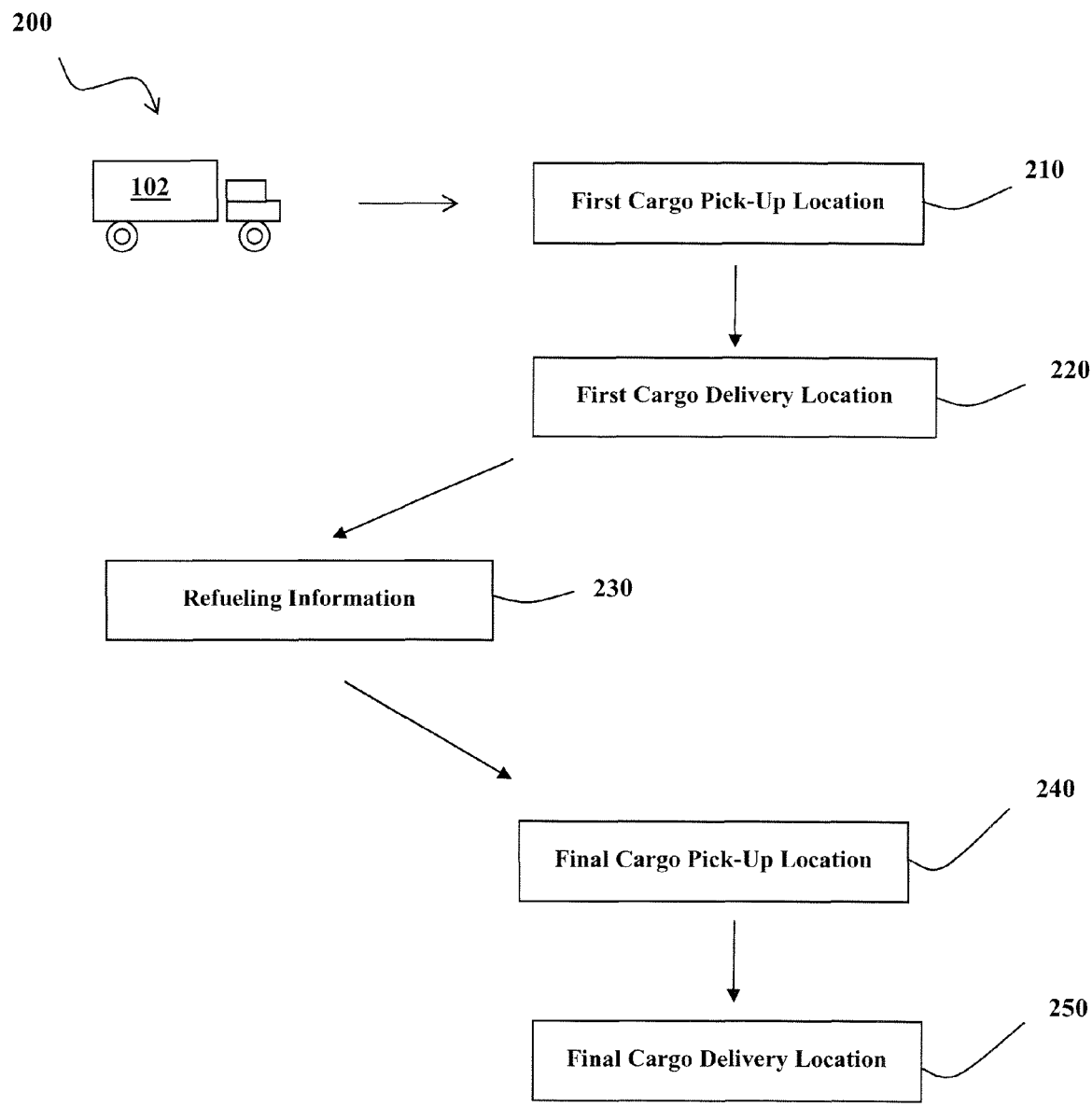
FIG. 2 is a schematic flowchart showing a sequence of activities for a driver of a full truckload truck. The driver responds to instructions provided within a cargo delivery data set sent by the host trucking management system.

FIG. 2 is a schematic flowchart showing a sequence of activities 200 for a driver of a full truckload truck 102. The driver responds to instructions embedded within the cargo delivery data set sent by the host trucking management system 110. In the illustrative sequence 200 of FIG. 2, the driver of the truck 102 receives a first cargo pick-up location. This is represented by Box 210. Pick-up location again means the location at which a load would be picked up to be carried by the truck driver in the attached trailer. The pick-up information preferably includes a scheduled pick-up time or window of time for pick-up. The pick-up location may also contain information concerning the identity of the customer and contact information.

The driver drives to the first cargo pick-up location 210. As the driver begins to move his truck, the communications module provides navigational instructions. The instructions may be in the form of a visual map; alternatively or in addition, the instructions may be verbal. These instructions are automatically generated and are not provided in response to any input by the driver other than an acceptance of the dispatch or other acknowledgement by the driver of the first cargo pick-location instruction.

The driver is directed to drive the truck 102 to a first cargo delivery location. This is shown in box 220. The first cargo delivery location 220 is the location at which a load is to be delivered. The load is preferably entirely unloaded at the delivery location 220. Information concerning the delivery location 220 preferably includes a scheduled delivery time or window of time for delivery. The delivery location may also contain information concerning the identity of the consignee and contact information.

The driver of the truck 102 may also receive refueling information. This is presented by Box 230. The refueling information 230 may actually be provided during the driver's travel from the first cargo pick-up location 210 to the first cargo delivery location 220. The refueling information 230 may alternatively be provided after arrival at a delivery location such as location 220. The refueling information 230 will include the location where fuel should be obtained by the truck driver. The refueling information 230 may also provided instructions for vehicle maintenance or servicing.

One or more interim pick-up and delivery locations may be provided. These are not shown in the sequence 200 of FIG. 2. Indeed, the first cargo pick-up location 210 and the first cargo delivery location 220 may be the only locations provided to the driver for a particular dispatch. Ultimately, the driver may be directed to a final cargo pick-up location. This is depicted by Box 240. The driver will pick up a load at the final cargo pick-up location 240. This is preferably a full truckload.

The driver is finally directed to a final cargo delivery location. This is presented by Box 250. The final cargo delivery location 250 represents a final point at which the truck 102 will be unloaded at a final consignee. The final delivery location 250 will include an address for final delivery. It will preferably also include the name and contact information for the final consignee.

Figure 3:
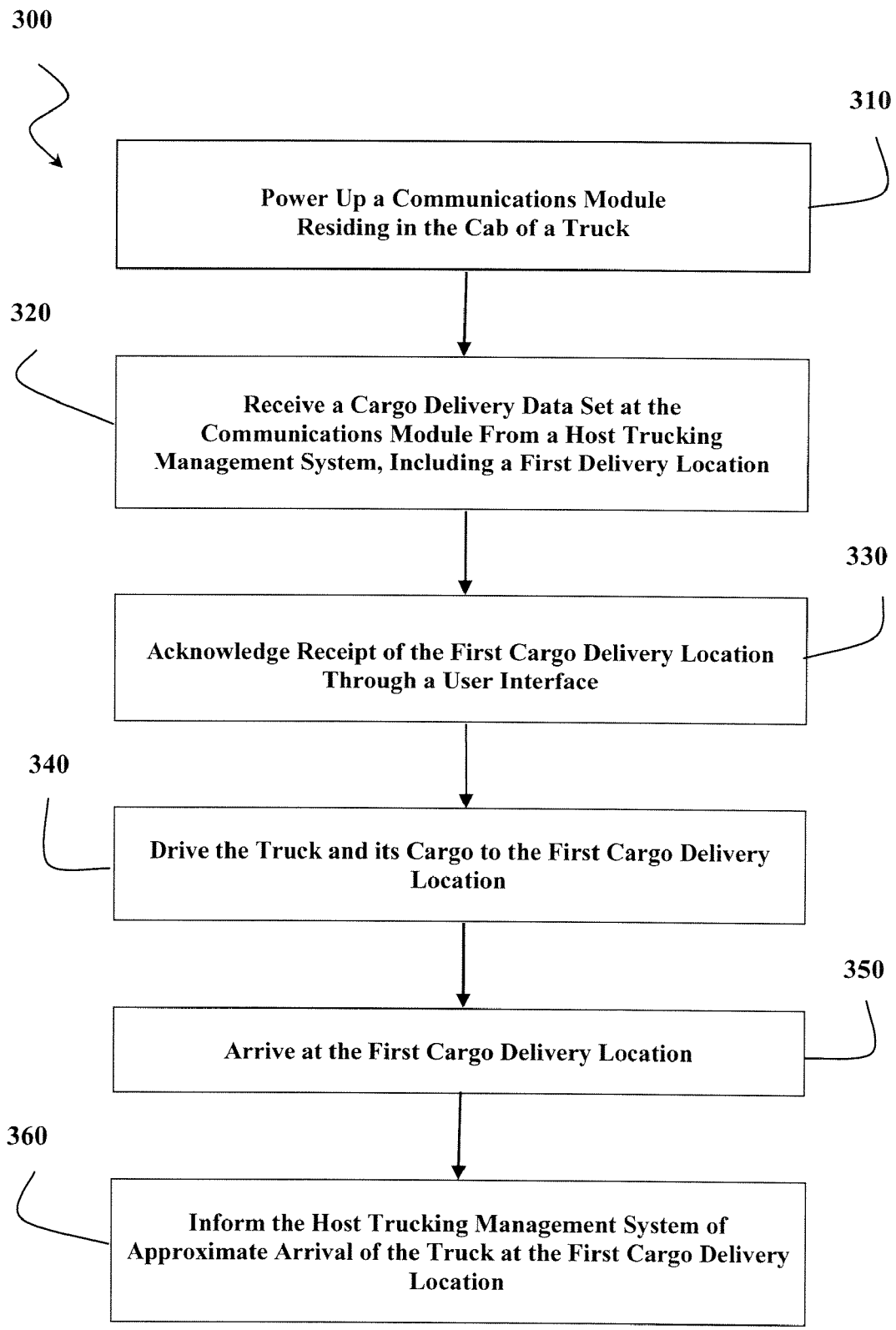
FIG. 3 is flowchart showing steps that may be performed for transporting full truckload cargo using a truck, in one embodiment. The truck has a communications module in it.

FIG. 3 is flowchart showing steps that may be performed for transporting full truckload cargo using a truck with a wireless communications system, in one embodiment. The truck may be, for example, truck 102, and includes a cab. The truck is operated by a driver.

The method 300 may first include powering up a communications module. This is indicated at Box 310 of FIG. 3. The communications module resides in the cab of the truck. The communications module includes a vehicle navigation system, a modem for receiving wireless telecommunications signals, a processing unit for associating instructions for cargo delivery locations with geo-positioning coordinates, and a user interface. For purposes of this application, the term "powering up" may mean turning the communications module on. Alternatively, the term "powering up" may mean that the driver logs into the communications module to access the module's interactive functionality.

The method 300 also includes receiving a cargo delivery data set at the communications module. This step is shown at Box 320. The cargo delivery data set represents a data stream carrying embedded cargo delivery instructions. The cargo delivery data set is sent from the host trucking management system 110.

As noted, the data set includes a first cargo delivery location. In addition, the cargo delivery data set may include a series of additional dispatch data such as a location for cargo pick-up from a consignor, a desired delivery time for the first cargo delivery, a first cargo pick-up location, a desired pick-up time for the first cargo pick-up location, a refueling location, a second cargo pick-up location, a second cargo delivery location, or combinations thereof. The instructions representing the cargo delivery data set may cause the navigational system to operate once the driver begins to move. Stated another way, as the driver begins to move, the navigational system will automatically start, implementing the preloaded dispatch instructions.

The method 300 also includes acknowledging receipt of the first cargo delivery location through the user interface. This preferably means that the driver acknowledges that he or she has received the instructions related to, for example, the first cargo delivery location. The communications module then sends a receipt signal to the host trucking management system. The step of acknowledging receipt is shown in Box 330. Step 330 may be done, for example, by the driver pushing an area of the touch screen on the communications module.

The method 300 next includes driving the truck and cargo to the first cargo delivery location. This is shown at Box 340. The driver operates the truck and contained cargo while referencing a map provided through the vehicle navigation system. Referencing the map may mean looking at a map, listening to verbal instructions concerning the map and the first cargo delivery location, or both.

The method 300 next includes arriving at the first cargo delivery location. This means that the cargo has been delivered to a desired location pursuant to instructions provided in the cargo delivery data set. This step is provided in Box 350.

The method 300 further includes informing the host trucking management system 110 of approximate arrival of the truck at the first cargo delivery location. This is done by sending a first arrival signal from the communications module. This step is shown in Box 360.

The first arrival signal may be initiated by the driver through the user interface. For example, the driver may touch a portion of the touch screen to affirmatively indicate approximate arrival. Alternatively, and more preferably, the first arrival signal is sent automatically by the processing unit upon receiving confirmation from the vehicle navigation system that the driver is within a specified distance from the first delivery location.

In one aspect, the method 300 further includes driving the truck and cargo to a second cargo delivery location while referencing the map provided by the vehicle navigation system. The driver arrives at the second cargo delivery location, whereupon the host trucking management system is again informed of arrival. In one aspect, the second cargo delivery location is not provided to the driver until after the driver has arrived at the first cargo delivery location.

Certain responsive features may be provided through the host trucking management system 110. These are in response to the host trucking management system receiving the first arrival signal. For example, in response to the host trucking management system receiving the first arrival signal, an invoice may be sent to a first consignee. Alternatively or in addition, in response to the host trucking management system receiving the first arrival signal, a payroll check may be sent to the driver. Alternatively or in addition, in response to the host trucking management system receiving the first arrival signal, a confirmation of delivery is sent to the first consignee. In one aspect, the confirmation of delivery is sent following a selected period of time after arrival of the truck at the first cargo delivery location. This may be based, for example, on an anticipated amount of time that it will take to unload the cargo at the first cargo delivery location.

Figure 4:
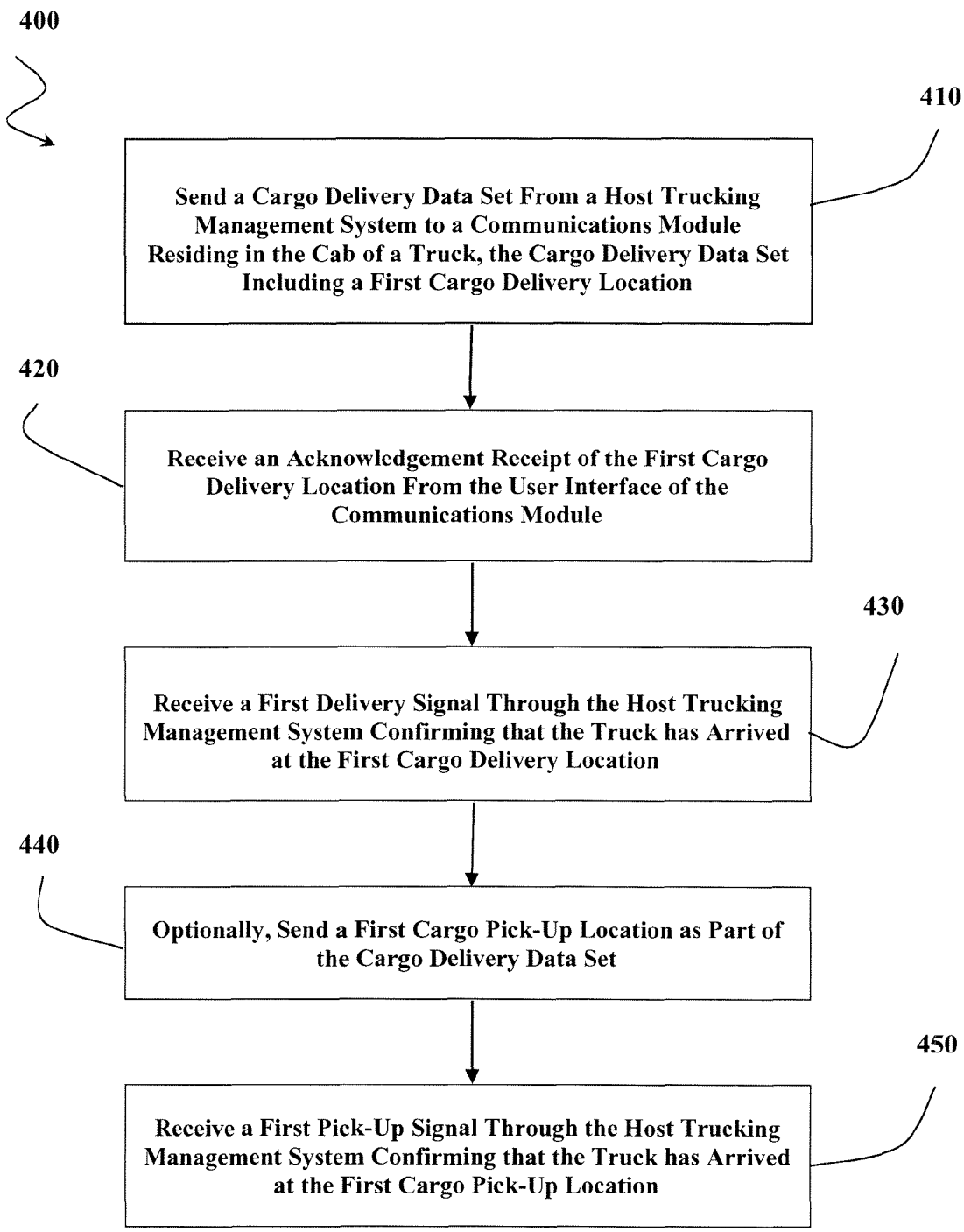
FIG. 4 is a flowchart showing steps that may be performed for coordinating the delivery of full truckload cargo, in one embodiment.

Another method is disclosed herein. That method pertains to operation of the host truck management system 110. FIG. 4 is flowchart showing steps 400 that may be performed for coordinating the delivery of full truckload cargo, in one embodiment. The full truckload cargo is delivered by a truck such as truck 102. The truck includes a cab and is operated by a driver.

The method 400 includes sending a cargo delivery data set from a host trucking management system to a communications module. This is provided at Box 410 of FIG. 4. The communications module is located in a cab in the truck. The communications module once again includes a vehicle navigation system, a modem for receiving wireless telecommunications signals, a processing unit for associating instructions for cargo delivery locations with geo-positioning coordinates, and a user interface. The vehicle navigation system automatically provides a map to the driver en route to a location in response to instructions embedded in the cargo delivery data set.

The cargo delivery data set includes a first cargo delivery location. In addition, the cargo delivery data set may include a desired delivery time for the first cargo delivery location, a first cargo pick-up location, a desired pick-up time for the first cargo pick-up location, a refueling location, a second cargo pick-up location, a second cargo delivery location, or combinations thereof. The instructions representing the cargo delivery data set may be implemented through the navigational system once the driver begins to move.

The method 400 next includes receiving an acknowledgement receipt of the first cargo delivery location from the user interface. This is shown at Box 420. As part of this step 420, a receipt signal is sent from the communications module to the host trucking management system. This may be done by the driver pressing an acknowledgement button on the touch screen of the in-cab communications module.

The method 400 further includes receiving a first delivery signal through the host trucking management system. This is presented in Box 430. The first delivery signal confirms that the truck has arrived at the first cargo delivery location.

The first delivery signal may be initiated by the driver through the user interface. For example, the driver may touch a portion of the touch screen to affirmatively indicate approximate arrival. Alternatively, or in addition, the first delivery signal is sent automatically by the processing unit upon receiving confirmation from the vehicle navigation system that the driver is within a specified distance from the first delivery location.

The method 400 also includes the optional step of sending a first cargo pick-up location. This is shown at Box 440. The first cargo pick-up location is part of the cargo delivery data set, and instructs the driver where to go to pick up cargo for the first cargo delivery location.

The method 400 also includes receiving a first pick-up signal through the host trucking management system. The first pick-up signal confirms that the truck has arrived at the first cargo pick-up location. This optional step may be employed when the cargo delivery data set instructs the driver as to a first cargo delivery location.

The methods described above are implemented through operational software. FIGS. 5 through 14 present a series of screen shots, or prints. The screen shots present illustrative screens as might be displayed on the user interface of the in-cab communications modules as part of the operational software. The illustrative screen shots provide information to the driver concerning dispatches, along with navigational instructions. Buttons may be provided on certain screens to adjust brightness and volume. Some screens will offer forms having fields that may be completed or filled in by a driver, and then sent through the wireless communications network.

Figure 5:
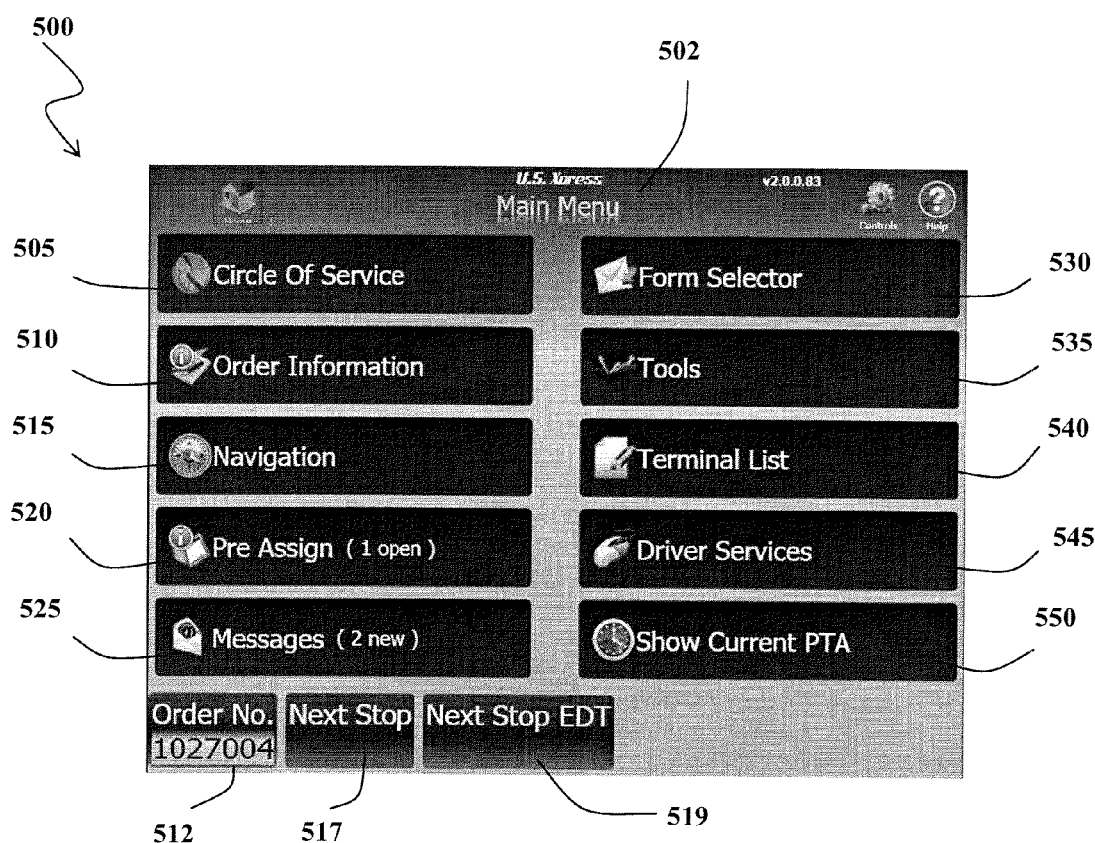
FIG. 5 is a screen print showing an initial menu display, in one embodiment, for the in-cab communications module.

FIG. 5 is a print of a screen showing an initial menu display 500, in one embodiment. The initial menu display 500 appears on the in-cab communications module for the driver once the driver is logged in. The initial menu display 500 allows the driver to access various applications available within the operational software.

The initial menu display 500 serves as a "main menu" for the driver. The illustrative initial menu display 500 of FIG. 5 actually includes the heading "Main Menu" in a top banner 502. The "Main Menu" offers a plurality of "tabs" that allow the driver to access various functions related to the delivery of FTL loads. In one aspect, the tabs offer a liquid crystal diode (LCD), touch-sensitive interface for the driver. The driver may touch the tabs using either a stylus or his or her finger.

A first tab seen on the initial menu display 500 is tab 505, entitled "Circle of Service." The driver may touch the Circle of Service tab 505, which then takes the driver to a submenu of messaging actions that the driver is requested to perform in order to implement a daily delivery operation. Thus, the Circle of Service tab 505 serves as something of a "life cycle" of a delivery order.

A next tab from the initial menu display 500 is entitled "Order Information." This is seen at tab 510. Touching or pressing the Order Information tab 510 provides a new screen that identifies customer and delivery information for the driver for a current delivery. This may also be referred to as "dispatch information."

Figure 6:
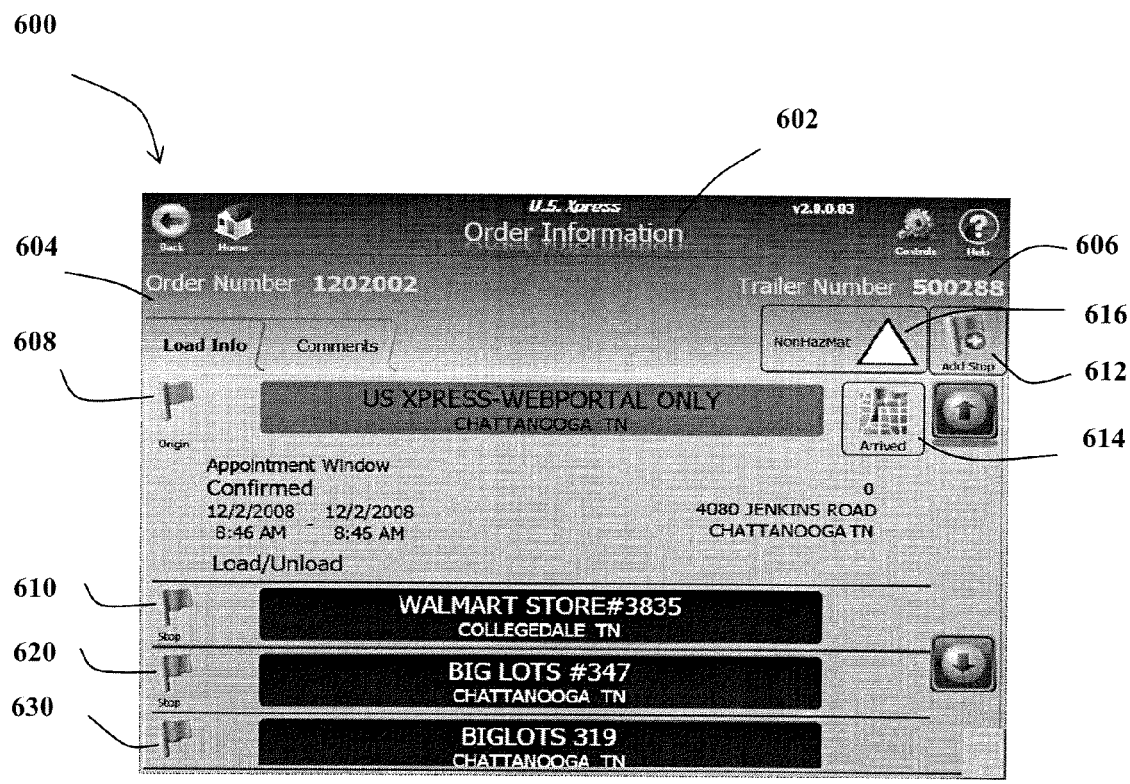
FIG. 6 is a screen print of an Order Information page showing dispatch information. Here, the driver may add stop information to trigger certain events within a workflow process.

FIG. 6 presents a screen 600 showing illustrative dispatch information. A banner 602 is seen at the top of the screen 600 stating "Order Information." The dispatch information in the Order Information screen 600 first includes an order number. In this example, the order number is "1202002." This is seen at 604. The dispatch information also identifies the driver's trailer. Here, the trailer number is "500288." This is seen at 606.

The dispatch information also provides a tab for the "Origin" of the delivery. This is seen at tab 608. In Order Information screen 600, the origin of delivery is at the facility of U.S. Xpress in Chattanooga, Tenn. The address is shown at 4080 Jenkins Road. The driver is to be there at 8:46 AM on Dec. 2, 2008. The "Origin" 608 represents a first cargo pick-up location.

The Order Information screen 600 also tells the driver what store or stores he or she is to deliver to. In the example of screen 600, the driver is to take a first load to Wal-Mart store number 3835 in Collegedale, Tenn. This is seen at tab 610. This represents a first cargo delivery location. The driver may press or touch tab 610 to obtain information about the delivery to the Wal-Mart store number 3835. Such information may include the store's address, intermediate fuel stops, and any special instructions. Such information will also, of course, provide the cargo pick-up location.

A touch-button is provided that allows the driver to add a stop to the order. An "Add Stop" icon is seen at 612. A stop may be, for example, for mechanical service. Adding stop information triggers certain events within a workflow process.

Figure 6A:
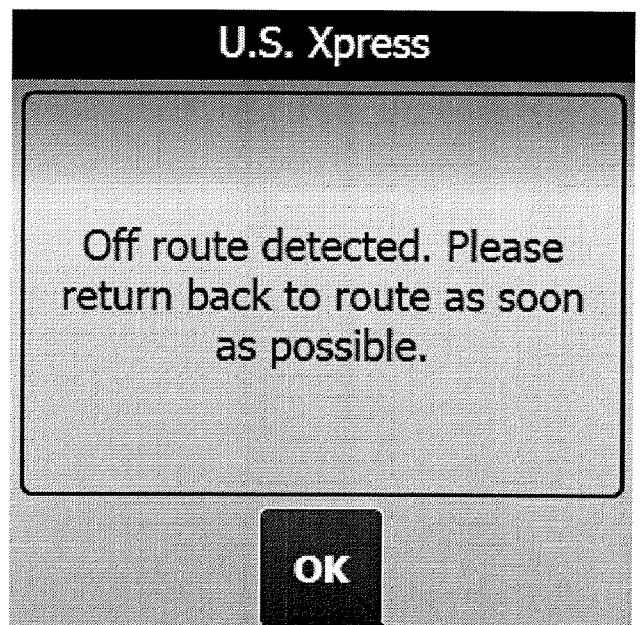
FIG. 6A provides an illustrative screen shot for advising a driver that he or she has gone "off route" in connection with a dispatch.

Should a driver detour from the designated route for his dispatch, such as order 610, without pressing the Add Stop icon 612, the navigation system for the operational software will detect the detour. FIG. 6A provides an illustrative screen shot 600A advising the driver that he or she has gone "off route." The driver is requested to return back to the designated route, and respond by pressing an "OK" button 602A.

Figure 6C:
FIG. 6C provides an illustrative screen shot advising a driver that he or she has reached an off route threshold.
Figure 6B:
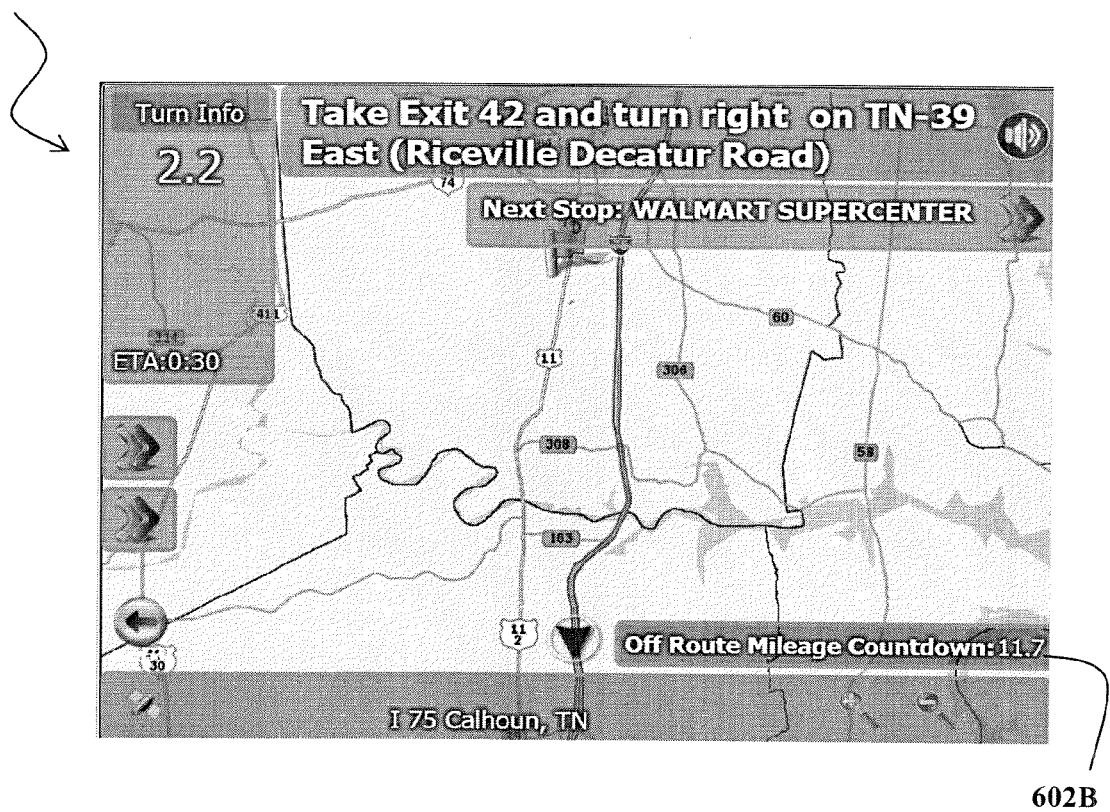
FIG. 6B presents a screen shot showing an off-route navigation screen.

If the driver does not respond and return to the designated route, the operational software may present the driver with a navigation screen indicating an "Off Route Mileage Countdown." FIG. 6B presents a screen shot showing an off-route navigation screen 600B. The "Off Route Mileage Countdown" 602B in illustrative navigation screen 600B shows that the driver has now ventured 11.7 miles off of the designated route.

Once the driver has reached an off-route threshold, the operational software may send the driver a subsequent notice. FIG. 6C provides an illustrative screen shot 600C advising the driver that he or she has reached an off route threshold. The driver is requested to respond by hitting an "OK" button 602C. A "Cancel" button 604C is optionally provided to allow the driver to minimize the prompt warning.

Returning to FIG. 6, the Order Information screen 600 also includes an "Arrived" icon. This is shown at 614. The Arrived icon 614 may be pressed when the driver arrives at a final delivery destination for order 610. Pressing the "Arrived" icon 614 informs the host trucking management system that the truck has arrived at the location. In the example of Order Information screen 600, a message is sent to the host trucking management system informing the host trucking management system that the driver has arrived at the delivery location for Wal-Mart in stop 610. An arrival macro may then be sent to the driver. The arrival macro is a template form message that is generated back to the host trucking management system that notifies the system that the driver has arrived at that particular stop or delivery location.

Figure 6D:
FIG. 6D provides a screen shot requesting confirmation from the driver of arrival at a cargo delivery destination according to a dispatch.
Figure 6D:

In an alternative embodiment, the navigational system senses that the driver has arrived at the cargo delivery destination. The host trucking management system then sends the driver a confirmation notice. FIG. 6D provides a screen shot 600D requesting confirmation of arrival. The driver is requested to press a "Yes" 602D or a "No" 604D button.

Figure 6E:
FIG. 6E provides a screen shot requesting confirmation from the driver of departure from a cargo delivery destination.
Figure 6E:

Once a load has been delivered, the driver may commence a next delivery order. The driver will have the cargo delivery location. FIG. 6E provides a screen shot 600E requesting confirmation from the driver of departure from a cargo delivery destination. This may be sent by the host trucking management system after a certain period of time from when the driver has arrived at the cargo delivery destination. Alternatively, this may be sent when the navigational system senses that the driver has arrived at the cargo delivery destination. In either event, the driver is requested to press a "Yes" 602E or a "No" 604E button.

Also of interest, Order Information screen 600 identifies the load as being either hazardous or non-hazardous. This is seen at icon 616. In the example of screen 600, the load is non-hazardous. A "NonHazMat" icon is shown.

The illustrative Order Information screen 600 includes more than one delivery destination. In tab 620, the driver is provided with instructions for delivering a load to Big Lots store number 347 in Chattanooga, Tenn. In tab 630, the driver is given information for the delivery of a third load to Big Lots store number 319, also in Chattanooga, Tenn. In connection with each of these stops, the driver may touch the corresponding tab 620, 630 to obtain cargo pick-up information and cargo delivery information. It is understood that while multiple stops may be involved in the delivery, this is still a Full Truck Load deliver as there is only one customer.

Returning once again to FIG. 5, the initial display menu 500 also includes a "Navigation" tab. This is shown at tab 515. Touching the Navigation tab 515 takes the driver to a screen that interfaces with Global Positioning System (GPS). The GPS provides geo-positioning coordinates for the truck through a Navigation screen (shown below in FIGS. 7A and 7B).

Figure 7A:
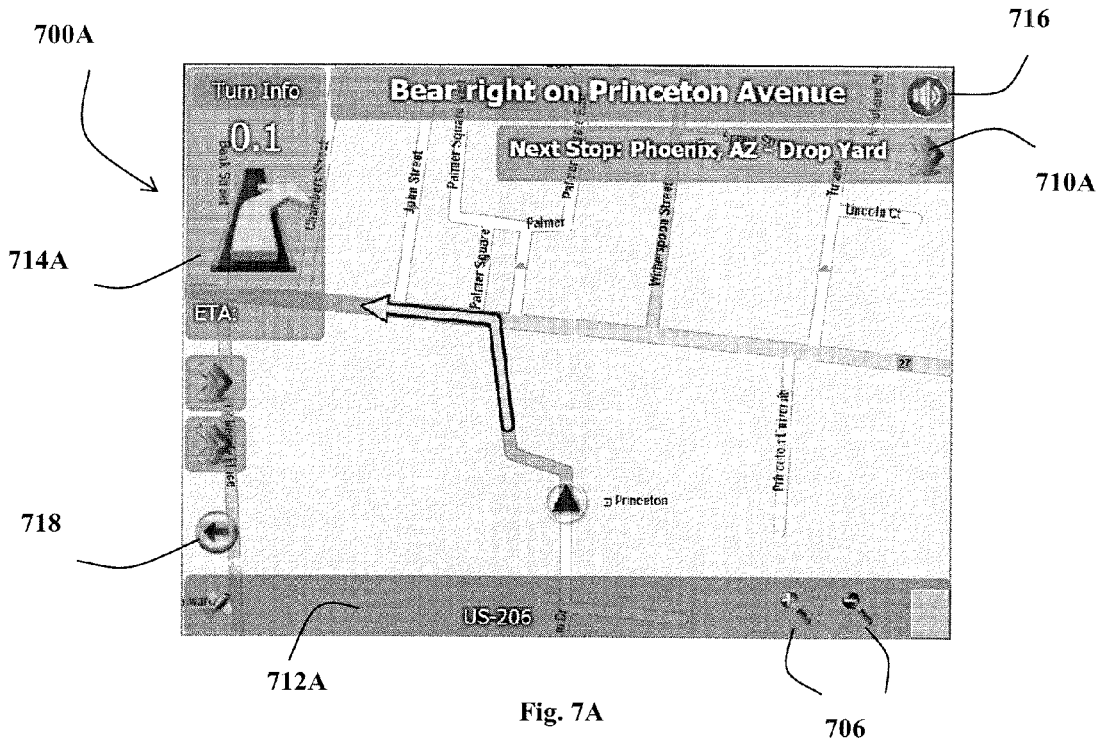
FIG. 7A is a screen print presenting navigation information for a driver en route to a cargo pick-up or deliver location.

FIG. 7A is a print of a Navigation screen 700A that interfaces with the GPS navigation system. The Navigation screen 700A provides the driver with turn-by-turn directions en route to a cargo pick-up or delivery location. The illustrative Navigation screen 700 is based upon ALK's CoPilot™ software. The Navigation screen 700 directs the driver visually and through verbal directions to various destinations in connection with a dispatch 610, 620, 630. The dispatches 610, 620, 630 are automatically loaded into the data stream through the operational software.

Figure 7B:
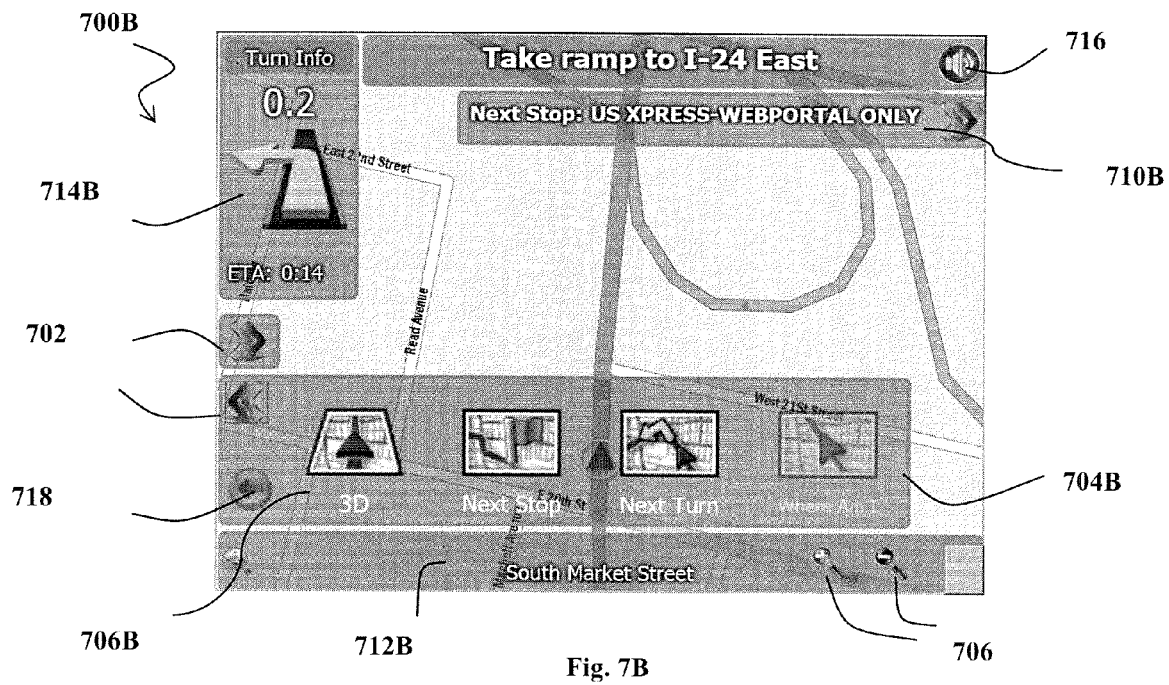
FIG. 7B is a screen print of an alternative embodiment of a navigation screen. This screen includes map view modes.

The Navigation screen 700A optionally includes links to ALK's CoPilot™ software functions. These may include CoPilot™ map view modes. The map view modes may bring up different views for the driver. FIG. 7B presents a screen shot of a Navigation screen 700B wherein map view modes are provided. The map views may be accessed by using arrows 702 for scrolling. For example, the driver may rotate views between a "where am I" mode (seen at 704B) and a "3-D mode" (seen at 706B). A button (not shown) may also be provided to show a "night mode." The driver may select any of these view modes for driving.

Navigation screens 700A and 700B both include zoom icons 706. The zoom icons 706 allow the driver to adjust the view of the map on the screen 700A or 700B to selectively zoom in or expand away. The Navigation screens 700A, 700B further includes a statement of the current road being traversed 712A, 712B, a next-turn instruction area 714A, 714B, and a mute voice button 716.

The Navigation screens 700A, 700B may also include a current destination tab 710A, 710B. The tab 710A (or 710B) provides a link to be pressed by the driver when the truck is not in motion. When the driver touches the destination tab 710A (or 710B), an itinerary for the current delivery is provided. In one aspect, the itinerary is converted by ALK software into a list of turn-by-turn instructions. The itinerary instructions will list the projected route for an entire dispatch.

The Navigation screens 700A, 700B also preferably provide software workflow options such as a "back" button 718. The back button 718 allows a driver to exit from the navigation screen 700A back to his Order Information screen 600.

In operation, as dispatch information is loaded into the host trucking management system, the dispatches 610, 620, 630 are automatically loaded into the operational software for the communications module. This includes the navigation system. The navigation system is accessed by the driver through tab 515 and screen 600. In a preferred embodiment, when operational software for the communications module detects that the truck is in motion, the software will automatically show the Navigation screen 700A or 700B.

As the driver in his Order Information screen 600 completes each stop and presses the "Arrived" 614 icon, the operational software takes the navigation system (screen 700A or 700B) to the next dispatch (such as dispatch 620) in the Order Information (screen 600) list. The driver is able to see the Navigation screen 700A or 700B, either by pressing the tab 515 of the initial display menu screen 500, or by placing his truck in motion and letting the Navigation screen 700A or 700B direct him to his next stop location 710A or 710B.

Referring again to the initial menu display 500 of FIG. 5, the display 500 also includes a tab entitled "Pre Assign." This is seen at tab 520. The term "Pre Assign" is a reference to a pre-assignment. This represents dispatch information that has been delivered to a driver for a next delivery. This could represent one dispatch or even three future dispatches. In the illustrative screen of FIG. 5, tab 520 shows there is "(1 open)," meaning one future dispatch that has not yet been viewed by the driver and accepted or declined.

The Pre Assign tab 520 differs from the Circle of Service tab 505 in the following major respect: The Pre Assign tab 520 allows the driver to see future loads or dispatches, while the Circle of Service tab 505 shows the driver a submenu of messaging actions that the driver is requested to perform in order to implement a daily delivery operation.

Figure 8:
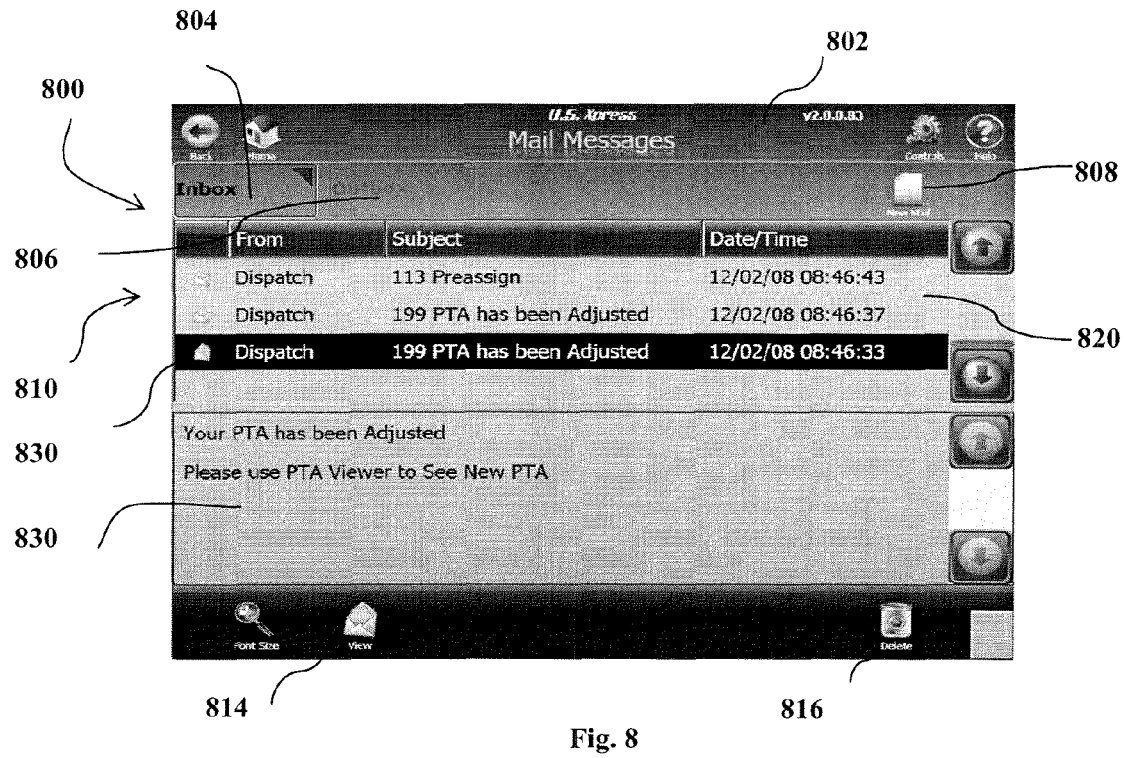
FIG. 8 is a screen print for an illustrative Inbox from a Mail Messages page. The Mail Messages page offers both an Inbox and an Outbox.

In operation, the driver may touch or press the Pre Assign tab 520 to view pending dispatches or "loads". Upon pressing the tab 520, the in-cab communications module opens a new screen, as shown in FIG. 8. FIG. 8 shows a "Mail Messages" screen 800, representing an illustrative mail messaging page, in one embodiment. The Mail Messages screen 800 includes a banner 802 at the top, presenting the title "Mail Messages."

An InBox 804 in the Mail Messages screen 800 allows the driver to view individual dispatches for future trips. Preferably, a Pre Assign message provides the driver with general information about each future trip, including point of origin, destination, mileage, and appointment windows. The driver may open the message in the InBox 804 and then confirm availability for the delivery. In addition, the Mail Messages screen 800 shows all additional textual communications between the host system and the driver. Such messages may include both free-form text messages and dispatch information.

Figure 8A:
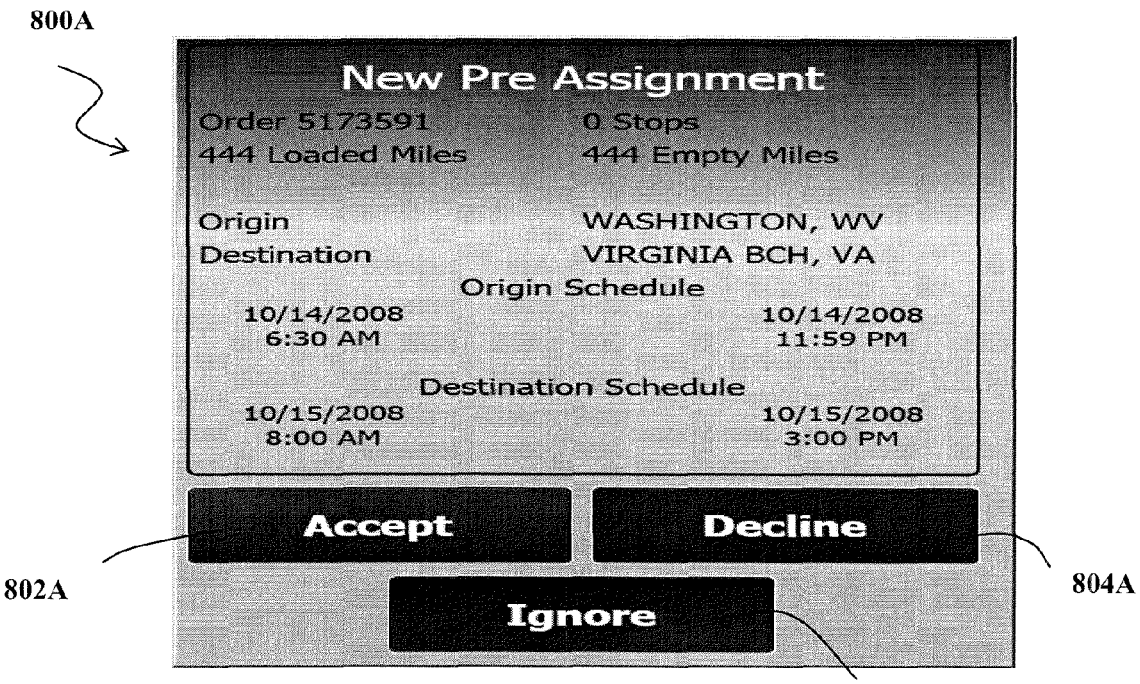
FIG. 8A is a screen print of a dispatch message as might be received in the Inbox from the trucking management system.

FIG. 8A is a screen print of a dispatch message 800A as might be sent from the trucking management system to a driver. The dispatch message 800A is accessed when a "View" button 814 is pressed. The dispatch message 800A allows the driver to review the proposed dispatch. In this illustrative dispatch, the cargo pick-up location is in Washington, W. Va., while the cargo delivery location is in Virginia Beach, Va.

Using the dispatch message 800A, the driver is given the option of accepting a pre-assignment message by pressing an "Accept" button 802A, or declining the pre-assignment message by pressing a "Decline" button 804A. If the driver needs more time to determine his or her schedule, the driver may press an "Ignore" button 806A. The message from the driver may ultimately be delivered to a fleet manager.

Returning to FIG. 5, the initial display menu 500 also includes a "Messages" tab. This is seen at tab 525. Pressing or touching tab 525 will also take the driver to the Mail Messages screen 800 of FIG. 8.

The Mail Messages screen 800 offers an Inbox tab 804 and an Outbox tab 806 for communications between the host trucking management system and the truck driver. Pressing the Inbox tab 804 allows the driver to see mail sent from the host trucking management system to the driver, while pressing the Outbox tab 806 allows the driver to see mail that he or she has sent to the host trucking management system. The Mail Messages screen 800 for mail messaging demonstrates a pre-defined mail messaging support, in one embodiment.

The upper half of the Mail Messages screen 800 provides a list of messages, including individual dispatch messages indicated at 810. A selected dispatch message 830 is being viewed by the driver in mail screen 800. In this instance, the message 830 relates to the adjustment of a "PTA," which refers to "Projected Time of Availability."

The bottom half of the Mail Messages screen 800 allows the driver to preview text of a selected message. Highlighting a message 830 shows the corresponding text for that message in the preview field 820. In FIG. 8, the driver is viewing text for dispatch 810 in the preview field 830. A "View" button 814 is offered that allows the driver to open the message 830 in a full panel (FIG. 8A).

The Mail Messages screen 800 also includes a separate "Delete" icon. The Delete icon is seen at 816. This permits the driver to select a message and then delete it by pressing the Delete icon 816.

It is noted that there are two messages that have not yet been viewed or answered. The Messages tab 525 shows "(2 new)", indicating that two messages that are unopened.

Mail screen 800 also includes an icon that allows the driver to create a new message. This is shown at the "New Mail" icon 808. When the "New Mail" icon 808 is pressed, a keypad appears on the screen (shown in FIG. 11 and discussed below). The driver may then "type" a message by pressing selected alpha-numeric keys on the keypad. Preferably, the screen that opens up for composing a message provides a series of forms having fillable fields, with a "Send" tab that allows the driver to send the message with populated fields to the host trucking management system.

Figure 9:
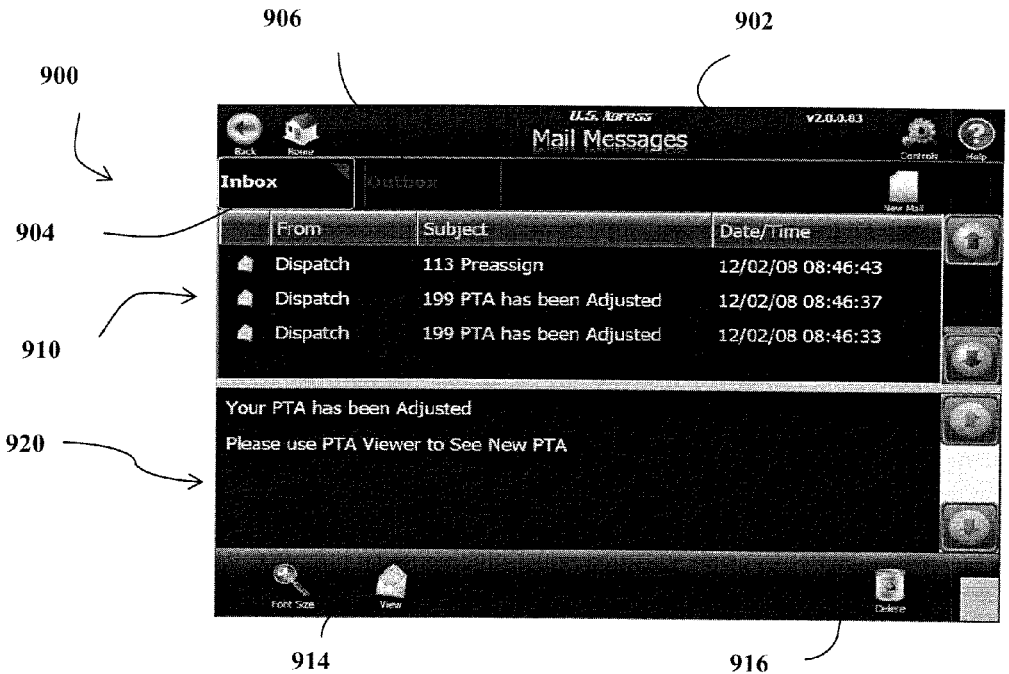
FIG. 9 is a screen print again presenting an illustrative Inbox from a Mail Messages page. The operational software offers "night skin" to assist the driver in viewing messages from the Mail Messages page when it is dark.

FIG. 9 presents a Mail Messages screen 900 in a second embodiment. The Mail Messages screen 900 contains the same configuration and InBox messages as Mail Messages screen 800. Mail messages screen 900 includes a banner 902 entitled "Mail Messages," an InBox tab 904, an OutBox tab 906, and a "New Mail" icon 908, all in accordance with Mail Messages screen 800.

Mail Messages screen 900 also includes various dispatch messages 910, a text preview field 920, a View icon 914, and a Delete icon 916. This again is all in accordance with Mail Message screen 800. The difference though with Mail Messages screen 900 is that Mail Messages screen 900 has a dimmed "skin" for night viewing. The night skin assists the driver in viewing messages when it is dark in the cab.

"Day" and "Night" skins may optionally be offered in connection with each screen using an icon in the menu header. Preferably, the communications module allows different kinds of lighting and color schemes as well as variations in contrast for different viewing options for the driver.

Referring once more to the initial menu display 500 of FIG. 5, the menu display 500 also includes a tab entitled "Form Selector." This is seen at tab 530. The Form Selector tab 530 provides a menu of forms that a driver may choose to use. For example, one form (not shown) allows a driver to submit a form requesting mechanical service of a company-owned truck or trailer. Another form allows a driver to request payroll information or other employment or pay-related information.

In one option, selecting the "New Mail" icon 808 from Mail Messages screen 800 also brings up a menu of forms that a driver may choose to use. In this instance, the menu may include a free-form option for drafting a message to the host trucking management system.

Figure 10:
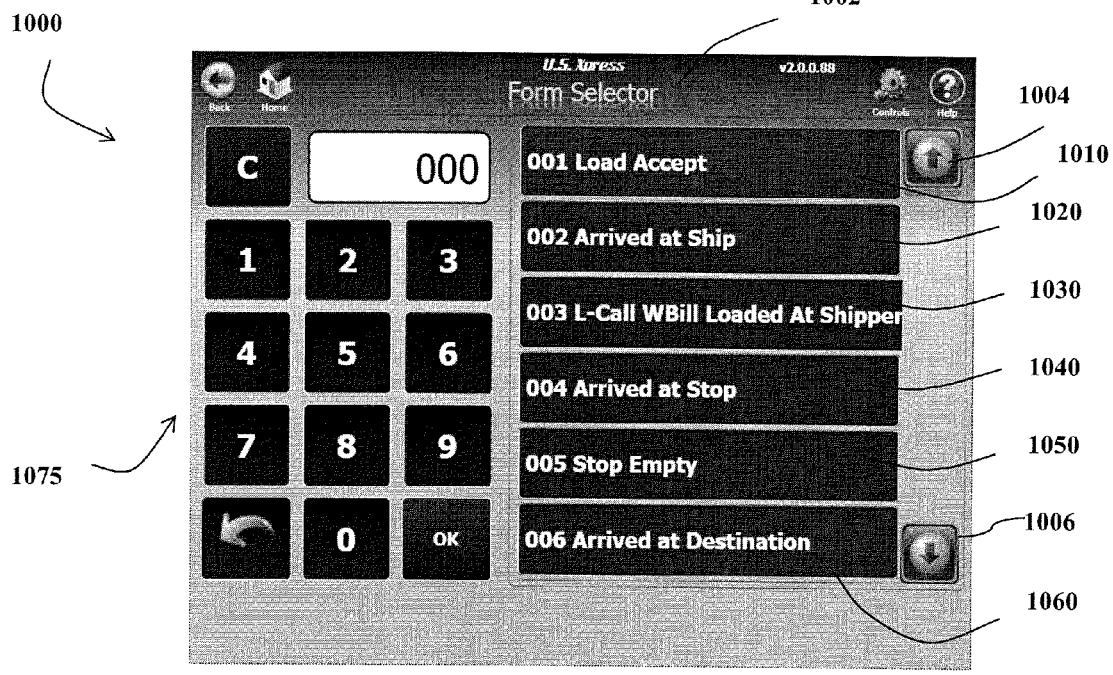
FIG. 10 provides a screen shot for a Form Selector screen. Illustrative forms are provided that may be selected by a driver, and then sent to the host trucking management system.

FIG. 10 provides a screen shot for a Form Selector screen 1000. A banner 1002 at the top of the screen 1000 provides the title "Form Selector." In the Form Selector screen 1000, illustrative forms are provided that may be selected by a driver. These include:

001 Load Accept (shown at Tab 1010)
    002 Arrived at Ship (shown at Tab 1020)
    003 L-Call WBill Loaded At Shipper (shown at Tab 1030)
    004 Arrived at Stop (shown at Tab 1040)
    005 Stop Empty (shown at Tab 1050)
    006 Arrived at Destination (shown at Tab 1060).

Of course, numerous additional forms may be included in the list of screen 1000. The various forms may be accessed by scrolling, using "up" arrow 1004 and "down" arrow 1006. The driver may press one of the Tabs of the Form Selector 1000, causing a new form to appear on the communications module. The driver may complete the form by filling in fields using a keypad. An optional calculator 1075 may also be provided on the Form Selector screen 1000.

Figure 11:
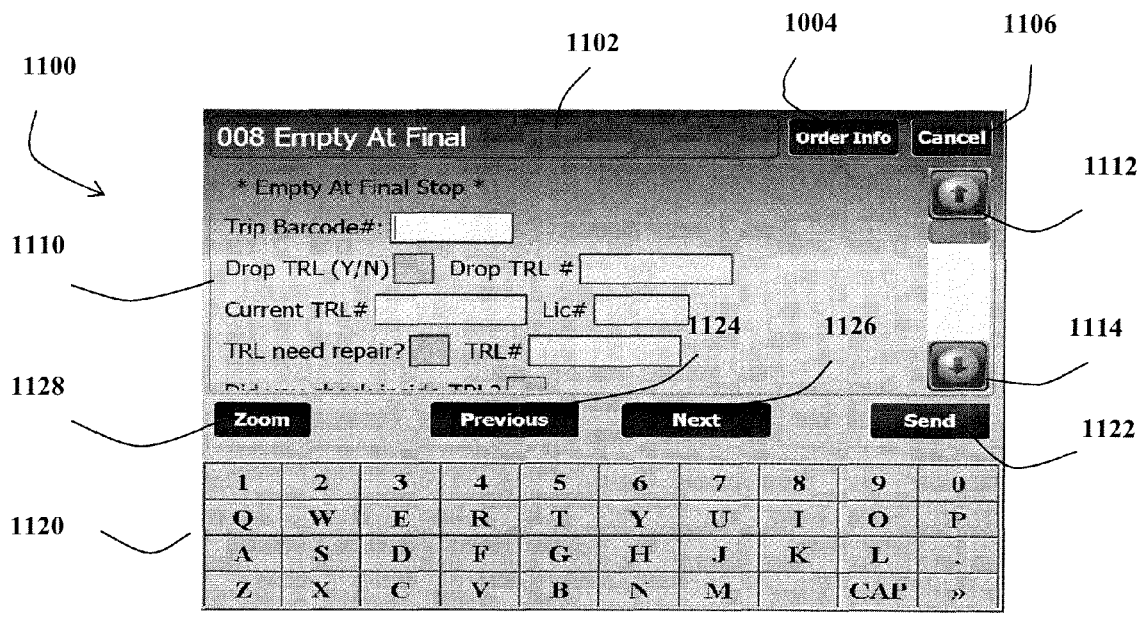
FIG. 11 is a screen print showing an illustrative message form by which a driver may enter information into a pre-defined message template.

FIG. 11 is a screen that shows an example of a form 1100 that may be selected from Form Selector screen 1000. The form 1100 offers a pre-defined message template for entering information into various fields. In this example, the form 1100 is used by a driver when he has delivered a trailer to a cargo delivery location. The form 1100 is entitled "Empty At Final." A banner 1102 is shown at the top of the form 1100 providing the title.

The Empty at Final form 1100 will appear when the driver presses the Stop Empty Tab 1050 from screen 1000. The illustrative Empty at Final form 1100 defines a template 1110. "Up" 1112 and "down" 1114 arrows allow the driver to scroll up and down along the template 1110. The template 1110 includes a variety of fields that are completed or filled in by the driver. Some of the fields in the illustrative template 1110 relate to the identification of the trailer being delivered.

The illustrative Empty at Final form 1100 also has a keypad 1120. The keypad 1120 provides alpha-numeric keys that may be pressed by the driver in filling out the fields in the template 1110. Once the fields are completed, the driver hits a "Send" button 1122. The form 1100 is then sent to the host trucking management system.

Other buttons may be provided with the keypad 1120. These may include Previous 1124 and Next 1126 buttons. These buttons 1124, 1126 allow the driver to view other forms from the Form Selector form 1000. A zoom button 1128 allows the driver to enlarge the view of the template 1010.

In the illustrative form 1100, the driver may also access order information. This may be done by pressing an "Order Info" button 1104 near the banner 1102. The form 1100 may be canceled by pressing a "Cancel" button 1106, also near the banner 1102. Pressing the Cancel button 1106 sends the driver back to the Form Selector screen 1000.

Figure 11A:
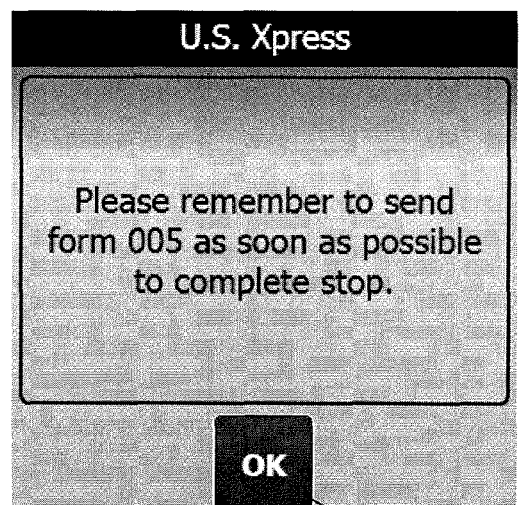
FIG. 11A shows a screen shot for an illustrative reminder to a driver to complete a form.

In one embodiment, a reminder window is provided to the driver through the In-Cab communications module. An illustrative reminder window 1100A is seen in FIG. 11A. The reminder window 1100A is associated with an auto-departure detection process. For example, if a driver leaves a customer location without sending an associated Circle of Service message, the reminder window 1100A will appear.

FIG. 11A shows a screen shot for an illustrative reminder 1100A to a driver. The reminder window 1100A reminds the driver to complete a form. The reminder 1100A says:

Please remember to send form 005 as soon as possible to complete stop.

The driver acknowledges this reminder 1100A by pressing an "OK" button 1102A. Other reminder windows for other reminders may also be employed.

The initial menu display 500 also includes a tab entitled "Tools." This is seen at tab 535. The Tools tab 535 offers a menu of applications. For example, a calculator may be provided as an application for the driver. This allows the driver to quickly compute such things as mileage or hours of service. Another possible application is a calendar. This allows the driver to add appointments or to make notes on a personal calendar. Dispatches may also be automatically entered into the driver's calendar by the operational software.

A next tab seen in FIG. 5 from the initial menu display 500 is a Terminal List. This is seen at tab 540. As implied by the name, the Terminal List tab 540 allows the driver to see a list of terminals for refueling and service. In some cases, a large trucking company may maintain its own terminals across a region for maintenance and repairs. In that case, the list of terminals may be a list of those terminals. In another instance, the list of terminals may be a list of preferred shops for servicing a driver's tractor or trailer, including location and contact information.

In one embodiment, the list of terminals may also be accessed through the Order Information screen 600. This would be done by pressing the "Add Stop" icon 612. In this embodiment, if a driver chooses a terminal, it will be loaded into his sequence of events for navigation.

Figure 12:
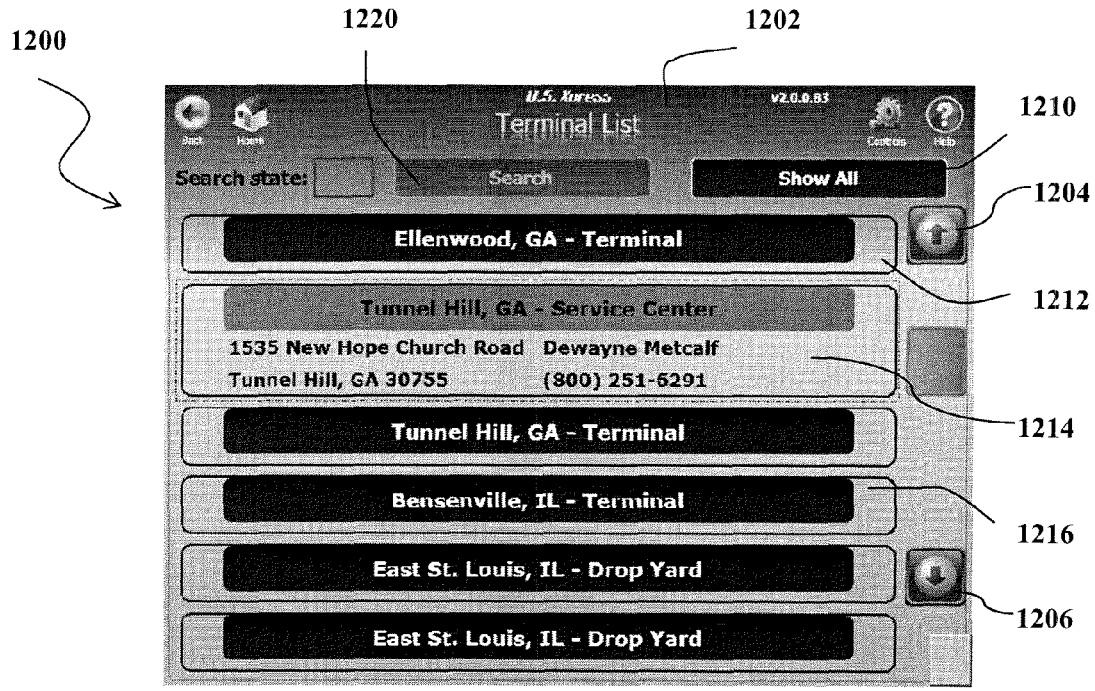
FIG. 12 is a screen print showing a Terminal List page that may be accessed by a driver using an in-cab communications module.

FIG. 12 is an example of a Terminal List screen 1200. The Terminal List screen 1200 has a banner 1202 at the top providing a "Terminal List" title for the screen 1200. The Terminal List screen 1200 provides a list of terminals that may be selected by a driver. The screen 1200 gives the driver the option of either seeing all of the terminals on the screen 1200, or searching for a specific terminal.

First, Terminal List screen 1200 includes a "Show All" button 1210. Pressing the Show All button 1210 provides all of the terminals in a database of the host trucking management system on the screen 1200. "Up" 1204 and "down" 1206 arrows allow the driver to scroll up and down the screen 1200 to view all of the terminals.

It can be seen in FIG. 12 that a series of terminals is presented, such as at tabs 1212, 1214, and 1216. In the illustrative screen 1200, the driver has selected tab 1214, which is for a terminal in Tunnel Hill, Ga. This causes address and contact information to appear on the screen 1200.

Second, a "Search" button 1220 is provided. This allows the driver to search for a specific terminal. The various terminals include drop yards and service centers.

In either option, the terminal list may include only vehicle service centers that are operated by a particular trucking company, or that are authorized under contract to provide service to vehicles for a particular trucking company. If the driver is an employee of the trucking company, the driver may have a fuel card that is used to pay for fuel and maintenance at the terminal. The card charges are then paid later by the company.

In some instances a driver may need to have an over-the-road repair, which refers to an unscheduled maintenance stop. The driver may request service from the maintenance department for the trucking company. The trucking company will approve a service at a terminal in the Terminal List screen 1200. For an approved vendor, the trucking company will have a billable account that is paid at the end of the month.

The list of terminals may optionally be accessed by a driver through the "Add Stop" button 612 from the Order Information screen 600. The operational software for the host trucking management system 110 will load the selected terminal into a driver's itinerary or Circle of Service, and provide navigation to the selected terminal. Alternatively, the trucking company can issue a one-time credit card pre-loaded with the funds needed to pay for maintenance.

Referring again to the initial menu display 500 of FIG. 5, a tab entitled "Driver Services" is also provided. This is seen at tab 545. Pressing the "Driver Services" tab 545 presents a library of materials (not shown) that are provided to the driver. The library is an electronic library, meaning that links to various texts and videos are provided. These may include, for example, a monthly company newsletter or a weekly safety video. The driver may also view information pertaining to safety procedures, payroll information, hours of services, weather reports, or combinations thereof.

The library is preferably loaded onto the communications module through the wireless communications network. The communications module includes an RSS reader that then allows the driver to view the materials off-line. Thus, the driver can read off-line the same content that they could view through a company intranet or a secure web portal.

In practice, each time a driver powers up a communications module, it is synched with information from the host trucking management system. Documents may be removed from the communications module, and new documents added for the Driver Services tab 545 in their place.

A final tab shown in FIG. 5 for the initial menu display 500 is entitled "Show Current PTA." This is seen at tab 550. "PTA" is an industry term that means projected time of availability. This means the date and time in which the driver is available to begin a next dispatch. By pressing the Show Current PTA tab 550, the driver can view his or her PTA as estimated by the host trucking management system.

Figure 13:
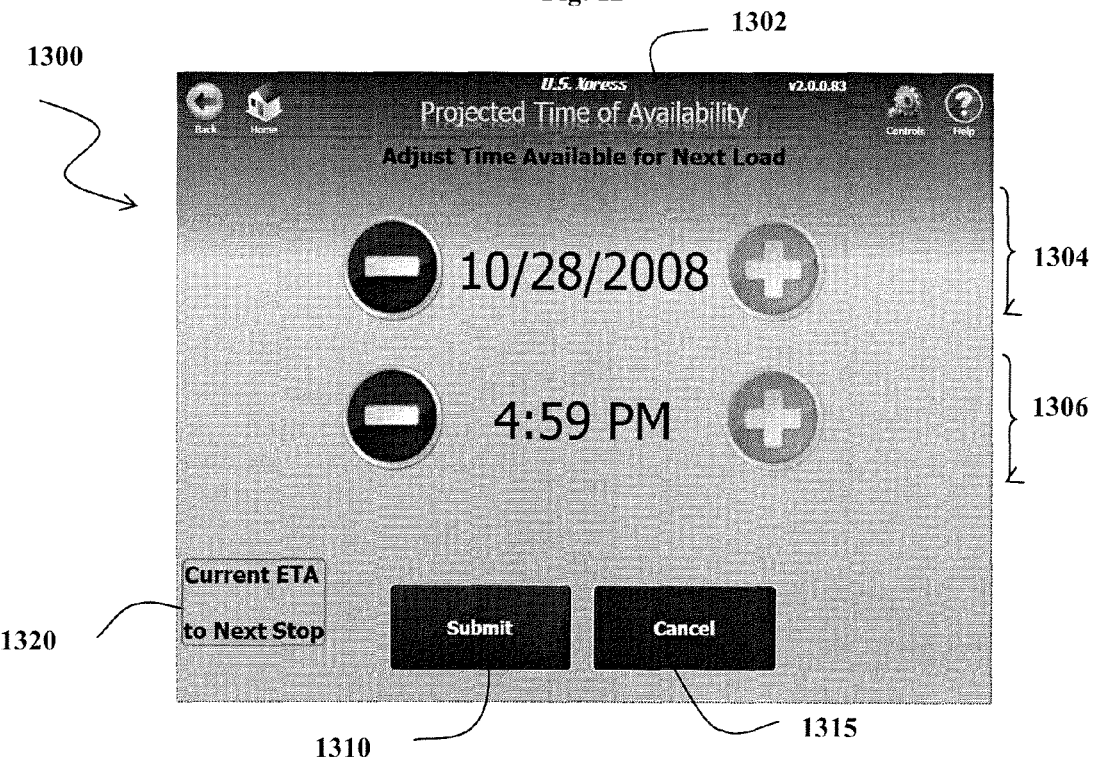
FIG. 13 provides a screen shot for viewing and adjusting a projected time of availability.

FIG. 13 provides a screen shot for a PTA screen 1300. This shows the projected time of availability for a driver, and also beneficially allows the driver to adjust the PTA. The PTA screen 1300 has a banner 1302 at the top showing the title of "Projected Time of Availability."

The illustrative PTA screen 1300 includes a field 1304 showing the date of the driver's availability for a next dispatch. The date may be adjusted in the field 1304 using "−" and "+" buttons. The illustrative PTA screen 1300 also includes a field 1306 showing the projected time of the driver's availability for a next dispatch. The time may also be adjusted in the field 1306 using "−" and "+" buttons. The driver may then submit any changes using a "Submit" button 1310. Alternatively, the driver may cancel any changes by using a "Cancel" button 1315.

Finally, the illustrative PTA screen 1300 includes a button entitled "Current ETA to Next Stop." This is shown at button 1320. Pressing this button 1320 allows a driver to see the estimated time of arrival for the driver's next stop as determined by the host trucking management system.

Another optional feature provided herein relates to monitoring a driver's idle condition. This is primarily a cost-savings feature. If the navigation system detects that the driver has not moved in a certain period of time, referred to as "idle threshold," then the host trucking management system sends a messages to the driver's communications module.

Figure 14A:
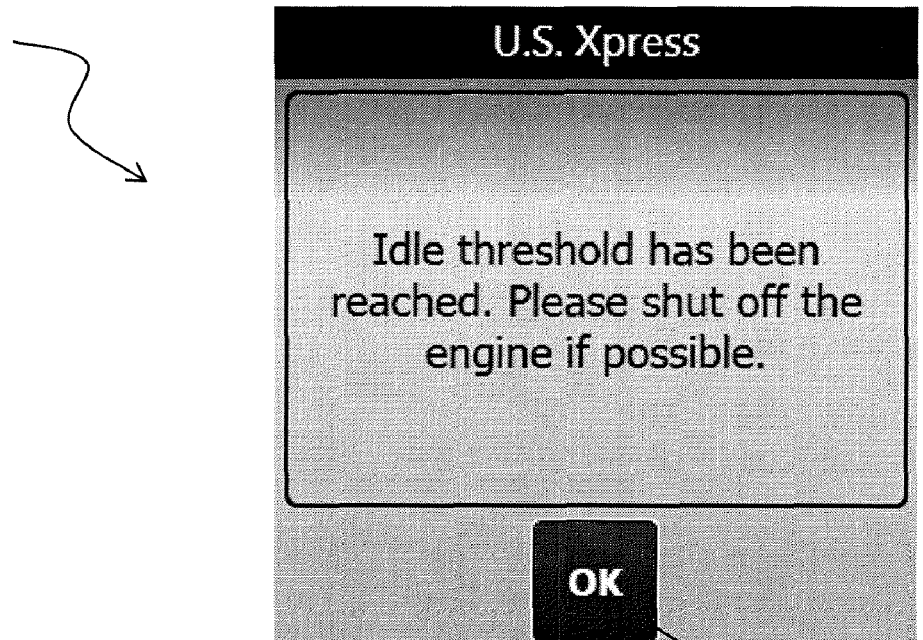
FIG. 14A provides a screen shot for an illustrative first idle threshold warning.

FIG. 14A provides a screen shot for an illustrative first idle threshold warning 1400A. The message for the first idle threshold warning 1400A states:

Idle threshold has been reached. Please shut off the engine if possible.

The driver should then press an "OK" button 1402A, and turn off the engine.

Figure 14B:
FIG. 14B provides a screen shot for an illustrative second idle threshold warning.

Regardless of whether the driver presses the "OK" button 1402A, if a total time threshold has been exceeded, a second idle threshold warning is sent from the host trucking management system. FIG. 14B provides a screen shot for an illustrative second idle threshold warning 1400A. That warning states:

Idle maximum has been reached. Operations has been notified. Please contact your FM.

The term "FM" refers to a fleet manager. The driver should then press an "OK" button 1402B, and turn off the engine. Once an idle maximum has been reached, the fleet manager may call the driver to verify why they are in an idle situation and approve the idle if necessary.

While it will be apparent that the inventions herein described are well calculated to achieve the benefits and advantages set forth above, it will be appreciated that the inventions are susceptible to modification, variation and change without departing from the scope of the claims, which are provided below. For example, the screen shots shown in FIGS. 5 through 14 demonstrate illustrative graphics for implementing various applications for the methods disclosed herein. The claims should not be construed as being limited to any graphics arrangement or screen display unless so stated.

We claim:

1. A method for transporting full truckload cargo using a truck, the truck comprising a cab in which a driver operates the truck, the method comprising:

powering up a communications module residing in the cab, the communications module comprising a vehicle navigation system, a modem for receiving wireless telecommunications signals, a processing unit for associating instructions for cargo delivery locations with geo-positioning coordinates, and a user interface;

receiving a cargo delivery data set at the communications module from a host trucking management system, the data set providing (i) a first cargo delivery location;

acknowledging receipt of the first cargo delivery location through the user interface, wherein a receipt signal is sent from the communications module to the host trucking management system;

driving the truck and cargo to the first cargo delivery location while referencing a map provided through the vehicle navigation system to the first cargo delivery location;

arriving at the first cargo delivery location; and informing the host trucking management system of approximate arrival of the truck at the first cargo delivery location by sending a first arrival signal from the communications module, wherein the first arrival signal is sent automatically by the processing unit upon receiving confirmation from the vehicle navigation system that the driver is within a specified distance from the first cargo delivery location.

2. The method of claim 1, wherein:

the cargo delivery data set further comprises (ii) a desired delivery time for the first cargo delivery location, (iii) a first cargo pick-up location, (iv) a desired pick-up time for the first cargo pick-up location, (v) a refueling location, (vi) a second cargo pick-up location, (vii) a second cargo delivery location, or (viii) combinations thereof; and the vehicle navigation system automatically provides a map to the driver en route to each of the included locations.

3. The method of claim 2, further comprising:

driving the truck and cargo to the first cargo pick-up location while referencing the map provided by the vehicle navigation system;

arriving at the first cargo pick-up location; and informing the host trucking management system of arrival at the first cargo pick-up location.

4. The method of claim 2, further comprising:

driving the truck and cargo to the second cargo delivery location while referencing the map provided by the vehicle navigation system;

arriving at the second cargo delivery location; and informing the host trucking management system of arrival at the second cargo delivery location.

5. The method of claim 2, wherein:

the cargo delivery data set comprises (i) the first cargo delivery location and (vii) the second cargo delivery location; and the second cargo delivery location is not provided to the driver until after the driver has arrived at the first cargo delivery location.

6. The method of claim 1, wherein, in response to the host trucking management system receiving the first arrival signal, an invoice is sent to a first consignee.

7. The method of claim 1, wherein, in response to the host trucking management system receiving the first arrival signal, a payroll check is created for the driver.

8. The method of claim 1, wherein, in response to the host trucking management system receiving the first arrival signal, a confirmation of delivery is sent to the first consignee.

9. The method of claim 8, wherein the confirmation of delivery is sent following a selected period of time after arrival of the truck at the first cargo delivery location.

10. The method of claim 1, wherein the communications module comprises a touch screen that serves as a user interface for communicating with the host tracking management system.

11. The method of claim 10, wherein:
operational software controls applications implemented through the touch screen; and
the applications are accessed through a menu screen having tabs for the applications.

12. The method of claim 11, wherein the tabs comprise applications for (i) a navigation screen, (ii) a messages screen having an inbox and an outbox, (iii) a terminal list screen, (iv) an order information screen showing information about at least one dispatch, or (v) combinations thereof.

13. The method of claim 11, further comprising:
alerting a driver through the touch screen when the driver has gone off-route.

14. The method of claim 11, wherein the tabs comprise an application for forms, the forms having fields that are fillable by the driver.

15. The method of claim 14, wherein the forms comprise a form completed by the driver using the touch screen when the driver has completed a delivery at the first cargo delivery location.

16. The method of claim 11, wherein the tabs comprise a projected time of availability tab that informs a driver as to a projected time of availability, and allows a driver to adjust the projected time of availability.

17. The method of claim 11, wherein the tabs comprise a driver services tab that allows a driver to view information pertaining to (i) safety procedures, (ii) payroll information, (iii) hours of service, (iv) weather reports, or (v) combinations thereof.

18. A method for coordinating the delivery of full truckload cargo, comprising:
sending a cargo delivery data set from a host trucking management system to a communications module, wherein:
the communications module is located in a cab in a remote truck to be driven by a driver,
the communications module comprises a vehicle navigation system, a modem for receiving wireless telecommunications signals, a processing unit for associating instructions for cargo delivery locations with geo-positioning coordinates, and a user interface, and
the cargo delivery data set comprises (i) a first cargo delivery location;
receiving an acknowledgement receipt of the first cargo delivery location from the user interface, wherein a receipt signal is sent from the communications module to the host trucking management system; and
receiving a first delivery signal through the host trucking management system confirming that the truck has arrived at the first cargo delivery location, wherein the first delivery signal is sent automatically by the processing unit upon receiving confirmation from the vehicle navigation system that the driver is within a specified distance from the first cargo delivery location.

19. The method of claim 18, wherein:
the cargo delivery data set further comprises (ii) a desired delivery time for the first cargo delivery location, (iii) a first cargo pick-up location, and (iv) a desired pick-up time for the first cargo pick-up location; and
the method further comprises receiving a first pick-up signal through the host trucking management system confirming that the truck has arrived at the first cargo pick-up location.

20. The method of claim 18, wherein:
the cargo delivery data set further comprises (v) a refueling location, (vi) a second cargo pick-up location, (vii) a second cargo delivery location, (viii) a desired delivery time for the second cargo delivery location, or (viii) combinations thereof; and
the method further comprises receiving a second delivery signal through the host trucking management system confirming that the truck has arrived at the second cargo delivery location.

21. The method of claim 20, wherein the vehicle navigation system automatically provides a map to the driver en route to each of the included locations.

22. The method of claim 18, further comprising:
sending an invoice to a first consignee after the host trucking management system receives the first delivery signal.

23. The method of claim 18, further comprising:
sending a payroll check to the driver after the host trucking management system receives the first delivery signal.

24. The method of claim 18, further comprising:
sending a confirmation of delivery to the first consignee after the host trucking management system receives the first arrival signal.

25. The method of claim 24, wherein the confirmation of delivery is sent following a selected period of time after arrival of the truck at the first cargo delivery location.

* * * * *